(12) United States Patent  (10) Patent No.: US 9,882,996 B2
Faaborg et al.  (45) Date of Patent: Jan. 30, 2018

(54) DETERMINING DATA ASSOCIATED WITH PROXIMATE COMPUTING DEVICES

(71) Applicant: Google Inc., Mountain View, CA (US)

(72) Inventors: Alexander Faaborg, Mountain View, CA (US); Gabriel Aaron Cohen, Alameda, CA (US)

(73) Assignee: Google LLC, Mountain View, CA (US)

( * ) Notice: Subject to any disclaimer, the term of this patent is extended or adjusted under 35 U.S.C. 154(b) by 865 days.

(21) Appl. No.: 14/176,862

(22) Filed: Feb. 10, 2014

(65) Prior Publication Data

US 2015/0207701 A1 Jul. 23, 2015

Related U.S. Application Data

(60) Provisional application No. 61/930,779, filed on Jan. 23, 2014.

(51) Int. Cl.
*G06F 15/173* (2006.01)
*H04L 29/08* (2006.01)
*H04W 4/02* (2009.01)

(52) U.S. Cl.
CPC ............ *H04L 67/18* (2013.01); *H04W 4/023* (2013.01)

(58) Field of Classification Search
CPC .............................. H04L 67/18; H04W 4/023
USPC ......................................................... 709/224
See application file for complete search history.

(56) References Cited

U.S. PATENT DOCUMENTS 6,339,437 B1    1/2002  Nielsen
6,446,004 B1 *  9/2002  Cao ........................ G06F 9/445
                                                          701/482
7,243,130 B2 *  7/2007  Horvitz ................ G05B 19/404
                                                          709/206
7,996,015 B2    8/2011  Bloebaum
8,233,918 B2    7/2012  Roin et al.
8,285,206 B2 * 10/2012  Martin ................. G06Q 10/109
                                                          455/41.2

(Continued)

FOREIGN PATENT DOCUMENTS

KR     20120115826     10/2012
WO      2011134020 A1  11/2011
WO     20130188682 A1  12/2013

OTHER PUBLICATIONS

International Preliminary Report on Patentability from International Application No. PCT/US2014/069737, dated Aug. 4, 2016, 11 pp.
International Search Report and Written Opinion from International Application No. PCT/US2014/069737, dated Jul. 30, 2015, 11 pp.

(Continued)

*Primary Examiner* — Imad Hussain
(74) *Attorney, Agent, or Firm* — Shumaker & Sieffert, P.A.

(57) ABSTRACT

A computing system is described that determines a location of a first computing device at a particular time. Responsive to determining that a second computing device is located within a threshold distance of the location of the first computing device at the particular time, the computing system identifies, based on contextual information associated with a user of the first computing device and contextual information associated with a user of the second computing device, at least one data file that the user of the first computing device is likely to access at the particular time. The computing system then outputs, for transmission to the first computing device, an indication of the at least one data file.

30 Claims, 6 Drawing Sheets

(56) References Cited

U.S. PATENT DOCUMENTS

| | | | | |
|---|---|---|---|---|
| 8,296,686 | B1* | 10/2012 | Tedesco | G06F 19/3406 434/112 |
| 9,652,556 | B2* | 5/2017 | Whitelaw | G06F 17/3097 |
| 2003/0156138 | A1* | 8/2003 | Vronay | G06F 3/0481 715/772 |
| 2003/0193558 | A1* | 10/2003 | Doss | H04N 7/147 348/14.01 |
| 2007/0061245 | A1* | 3/2007 | Ramer | G06F 17/30867 705/37 |
| 2008/0160976 | A1* | 7/2008 | Virolainen | H04M 3/568 455/416 |
| 2008/0301149 | A1* | 12/2008 | Malcolm | G06F 17/30035 |
| 2009/0163182 | A1* | 6/2009 | Gatti | G06F 9/4443 455/414.1 |
| 2010/0093365 | A1* | 4/2010 | Bloebaum | G06F 17/30265 455/456.1 |
| 2010/0211575 | A1* | 8/2010 | Collins | G06F 17/30044 707/749 |
| 2010/0216402 | A1 | 8/2010 | Appleby et al. | |
| 2011/0040618 | A1* | 2/2011 | Wagenblatt | G06Q 30/02 705/14.46 |
| 2011/0045847 | A1* | 2/2011 | Roin | H04W 4/02 455/456.3 |
| 2011/0209159 | A1* | 8/2011 | Baratz | G06F 17/30528 718/108 |
| 2012/0254246 | A1* | 10/2012 | Kerger | H04W 4/206 707/780 |
| 2012/0258696 | A1* | 10/2012 | Nam | H04W 4/001 455/414.2 |
| 2012/0258726 | A1* | 10/2012 | Bansal | H04M 1/72563 455/456.1 |
| 2013/0019174 | A1* | 1/2013 | Gil | G06F 3/04812 715/711 |
| 2013/0046770 | A1 | 2/2013 | Tseng | |
| 2013/0109359 | A1* | 5/2013 | Bergmann | H04W 4/16 455/412.1 |
| 2013/0110772 | A1* | 5/2013 | Svendsen | G06F 17/30029 707/609 |
| 2013/0163382 | A1* | 6/2013 | Millar | G01S 13/46 367/127 |
| 2013/0339345 | A1* | 12/2013 | Soto Matamala | G06F 17/3089 707/722 |
| 2014/0089449 | A1* | 3/2014 | Bhogal | H04L 67/06 709/213 |
| 2014/0267148 | A1* | 9/2014 | Luna | G06F 1/3231 345/174 |
| 2015/0011187 | A1* | 1/2015 | Wetzold | H04W 4/02 455/411 |
| 2015/0127640 | A1* | 5/2015 | Nordstrom | G06F 17/3053 707/723 |
| 2015/0143409 | A1* | 5/2015 | Maughan | H04N 21/262 725/34 |
| 2016/0094937 | A1* | 3/2016 | Wang | H04W 4/02 455/456.3 |

OTHER PUBLICATIONS

"Yammer Full Feature List", Yammer [online]. First Accessed on Oct. 30, 2013. Retrieved from the Internet: <https://about.yammer.com/product/feature-list/> 14 pgs.

Extended Search Report from counterpart European Application No. 14821990.0, dated Feb. 16, 2017, 7 pp.

Response to Extended Search Report dated Feb. 16, 2017, from counterpart European Application No. 14821990.0, filed Sep. 11, 2017, 13 pp.

* cited by examiner

US 9,882,996 B2

DETERMINING DATA ASSOCIATED WITH PROXIMATE COMPUTING DEVICES

This application claims the benefit of U.S. Provisional Application No. 61/930,779, filed Jan. 23, 2014, the entire content of which is hereby incorporated by reference.

BACKGROUND

A computing device may have access to a large quantity of data files stored locally and/or remotely from the computing device. Such a computing device may present a user interface that provides a representation of the different data files that the computing device has access to at a particular time. The computing device may detect input associated with the user interface intended to locate one or more such data files. Such interaction may not always quickly or efficiently locate the particular data file(s) that the user wishes to interact with at a particular time, however.

SUMMARY

In one example, the disclosure is directed to a method that includes determining, by a first computing device, a location of the first computing device at a particular time. Responsive to determining that a second computing device is located within a threshold distance of the location of the first computing device at the particular time, the method further includes identifying, by the first computing device and based on contextual information associated with a user of the first computing device and contextual information associated with a user of the second computing device, at least one data file that the user of the first computing device is likely to access at the particular time. The method further includes outputting, by the first computing device, for display, a graphical indication of the at least one data file.

In another example, the disclosure is directed to a first computing device that includes at least one processor and at least one module operable by the at least one processor to determine a location of the first computing device at a particular time. The at least one module is further operable by the at least one processor to responsive to determining that a second computing device is located within a threshold distance of the location of the first computing device at the particular time, identify, based on contextual information associated with a user of the first computing device and contextual information associated with a user of the second computing device, at least one data file that the user of the first computing device is likely to access at the particular time. The at least one module is further operable by the at least one processor to output, for transmission to the first computing device, an indication of the at least one data file.

In another example, the disclosure is directed to a method that includes determining, by a computing system, a location of a first computing device at a particular time, and responsive to determining that a second computing device is located within a threshold distance of the location of the first computing device at the particular time, identifying, by the computing system, based on contextual information associated with a user of the first computing device and contextual information associated with a user of the second computing device, at least one data file that the user of the first computing device is likely to access at the particular time. The method further includes outputting, by the computing system, for transmission to the first computing device, an indication of the at least one data file.

In another example, the disclosure is directed to a computing system that includes at least one processor, and at least one module operable by the at least one processor to determine a location of a first computing device at a particular time. The at least one module is further operable by the at least one processor to responsive to determining that a second computing device is located within a threshold distance of the location of the first computing device at the particular time, identify, based on contextual information associated with a user of the first computing device and contextual information associated with a user of the second computing device, at least one data file that the user of the first computing device is likely to access at the particular time. The at least one module is further operable by the at least one processor to output, for transmission to the first computing device, an indication of the at least one data file.

The details of one or more examples are set forth in the accompanying drawings and the description below. Other features, objects, and advantages of the disclosure will be apparent from the description and drawings, and from the claims.

DETAILED DESCRIPTION

Figure 1:
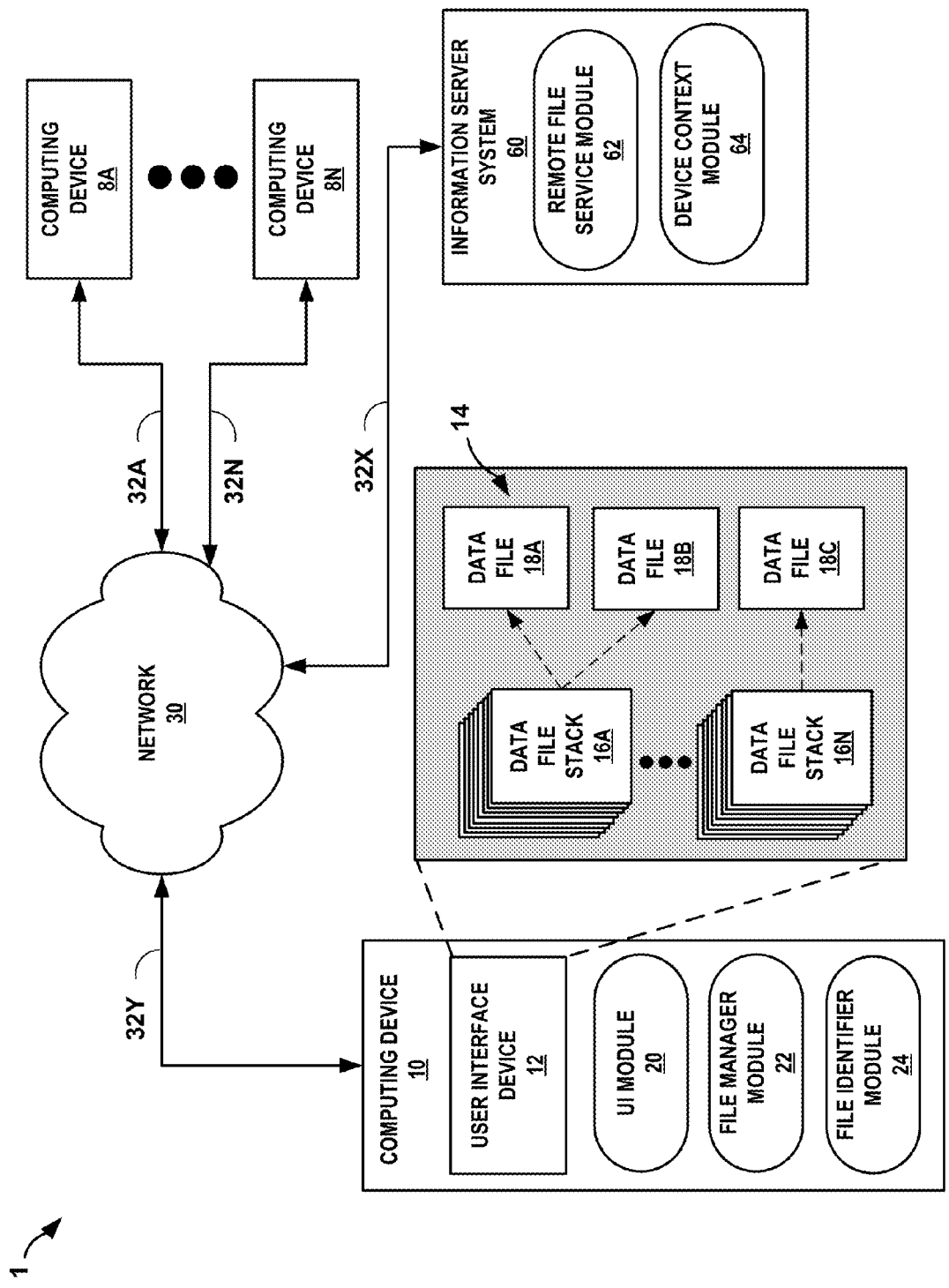
FIG. 1 is a conceptual diagram illustrating an example computing system that identifies one or more data files that may be of interest to a user, in accordance with one or more aspects of the present disclosure.

In general, techniques of this disclosure may enable a computing device to automatically identify or "predict" one or more data files that may be of interest to a user of the computing device at a particular time. The computing device may automatically identify the one or more data files based on contextual information associated with the user of the computing device and/or users of other nearby (e.g., physically proximate) computing devices. The computing device may automatically predict, based on the contextual information, which one or more data files that the user is likely to access at a particular time and output a graphical indication of the identified or predicted data files.

When the computing device determines that other computing devices are within a threshold distance of the location of the computing device, the computing device may infer that the user of the computing device and the respective other users of the other computing devices are physically proximate to one another (e.g., in a collaborative environment). The computing device may predict that the one or more data files that the user is likely to access at a particular time are the one or more data files that have attributes associated with the user of the computing device, the other nearby users, the particular time, the location of the computing device, or any combination thereof. In examples where the computing device determines that the user of the computing device and the other users are physically proximate to one another (e.g., in a collaborative environment), the computing device may output a graphical indication of the one or more data files that the computing device predicts will be accessed by the user when collaborating with the other users at the particular time rather than require the user to navigate through a graphical user interface (e.g., of a file system) to access one or more data files.

Throughout the disclosure, examples are described where a computing device and/or a computing system may analyze information (e.g., locations, speeds, calendars, communications, etc.) associated with the computing device and/or the computing system only if the computing device and/or the computing system receives permission from the user to analyze the information. For example, in situations discussed below in which the computing device and/or the computing system may collect or may make use of contextual information associated with a user and/or contextual information associated with a computing device, the user may be provided with an opportunity to provide input to control whether programs or features of the computing device and/or the computing system can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or the computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or the computing system.

FIG. 1 is a conceptual diagram illustrating an example computing system that identifies one or more data files that may be of interest to a user, in accordance with one or more aspects of the present disclosure. Computing system 1 of FIG. 1 is an example computing system that includes computing device 10, computing devices 8A-8N (collectively, "computing devices 8"), information server system 60, and network 30.

Network 30 represents any public or private communication network, for instance, a cellular, Wi-Fi, and/or other type of network for transmitting data between computing devices. Computing devices 8, computing device 10, and information server system 60 may each send and receive data across network 30 using any suitable communication techniques. For example, computing device 8A may be operatively coupled to network 30 using network link 32A, and computing device 8N may be operatively coupled to network 30 using network link 32N. Information server system 60 may be operatively coupled to network 30 by network link 32X and computing device 10 may be operatively coupled to network 30 using network link 32Y. Network 30 may include network hubs, network switches, network routers, etc., that are operatively inter-coupled thereby providing for the exchange of information between computing devices 8, computing device 10 and information server system 60. In some examples, network links 32A-32N, 32X, and 32Y (collectively, "network links 32") may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32X to network 30. In some examples, information server system represents a host server for a file system or data storage service. Computing device 10 and/or computing devices 8 may access a file system or data storage service hosted by information server system 60 for transmitting and/or receiving information associated with one or more data files between platforms, applications, and services executing at computing devices 8 and 10. In some examples, information server system 60 represents a cloud computing system that provides file system or data storage services through network 30 to one or more of computing devices 8 and 10 that access the file system or data storage services via access to the cloud provided by information server system 60.

In the example of FIG. 1, information server system 60 includes remote file service module 62 and device context module 64. Modules 62 and 64 may perform operations described using software, hardware, firmware, or a mixture of hardware, software, and firmware residing in and/or executing at information server system 60. Information server system 60 may execute modules 62 and 64 with multiple processors or multiple devices. Information server system 60 may execute modules 62 and 64 as virtual machines executing on underlying hardware. Modules 62 and 64 may execute as one or more services of an operating system or computing platform. Modules 62 and 64 may execute as one or more executable programs at an application layer of a computing platform.

Remote file service module 62 may perform functions related to hosting a remote file system or data storage service that provides access to one or more data files stored by information server system 60 and accessible to one or more remote computing devices (e.g., computing devices 8 and 10) via commands or requests transmitted over network 30 by computing devices 8 and 10. For example, remote file service module 62 may receive and respond to requests for access to one or more data files managed by the remote file system or data storage service of information server system 60. Remote file service module 62 may respond to a request received from file manager module 22 by outputting, for transmission to computing device 10, an indication of one or more data files maintained by information server system 60. Remote file service module 62 may process a request received from file manager module 22 by performing read, write, etc. operations on the one or more data files.

In some examples, remote file service module 62 may perform operations related to identifying or "predicting" one or more data files that a user of a computing device (e.g., computing device 10) may likely access at a particular time. For examples, remote file service module 62 may include similar features or capabilities of file manager module 22 and file identifier module 24 described herein. Remote file service module 62 may use the similar features or capabilities of file manager module 22 and file identifier module 24 to determine one or more data files being managed and/or stored by remote file service module 62 and identified or "predicted", by remote file service module 62, to be accessed by the user of the computing device at the particular time. Remote file service module 62 may output one or more indications (e.g., packets of data, memory pointers to data, file names, file locations, etc.) of the one or more data files that remote file service module 62 determines may be accessed by the user of the computing device at the particular time. As used herein, a particular time (e.g., an hour, a minute, a calendar day, a calendar month, etc.) may correspond to a current time of day associated with a computing device or system or a future time of day associated with the computing device or system. Device context module 64 may provide a device contextual information service that transmits contextual information (e.g., respective locations, direction, speed, velocity, orientation, etc.) to computing device 10 in response to receiving a request from one of computing device 10 for data specifying the state or physical operating environment of computing devices 8. For example, device context module 64 may determine respective physical locations associated with each of computing devices 8 and update the respective physical locations as device context module 64 detects respective movement associated with each of computing devices 8 over time. Device context module 64 may respond to a request from file identifier module 24 of computing device 10 for contextual information associated with computing devices 8 by outputting, for transmission to computing device 10, data maintained by device context module 64 that specifies the contextual information (e.g., respective locations) associated with computing devices 8.

As used throughout the disclosure, the term "contextual information" is used to describe information that can be used by a computing system and/or computing device, such as information server system 60 and computing device 10, to determine one or more environmental characteristics associated with computing devices and/or users of computing devices, such as past, current, and future physical locations, degrees of movement, weather conditions, traffic conditions, patterns of travel, and the like. In some examples, contextual information may include sensor information obtained by one or more sensors (e.g., gyroscopes, accelerometers, proximity sensors, etc.) of computing devices 8 and 10, radio transmission information obtained from one or more communication units and/or radios (e.g., global positioning system (GPS), cellular, Wi-Fi, etc.) of computing devices 8 and 10, information obtained by one or more input devices (e.g., cameras, microphones, keyboards, touchpads, mice, UID 12, etc.) of computing devices 8 and 10, and network/device identifier information (e.g., a network name, a device internet protocol address, etc.).

In the example of FIG. 1, computing device 10 is a laptop computer while computing devices 8 are mobile phones or tablet computers. However, in other examples, computing devices 8 and 10 may be any combination of tablet computers, mobile phones, personal digital assistants (PDA), desktop computers, laptop computers, gaming systems, media players, e-book readers, television platforms, automobile navigation systems, wearable computing device (e.g., a computerized watch, computerized eyewear, computerized gloves, etc.), or any other types of mobile and/or non-mobile computing devices that are configured to communicate (e.g., transmit and receive data) across a network, such as network 30.

As shown in FIG. 1, computing device 10 includes user interface device (UID) 12. UID 12 of computing device 10 may function as an input and/or output device for computing device 10. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), a dot matrix display, a light emitting diode (LED) display, an organic light-emitting diode (OLED) display, an e-ink, or a similar monochrome or color display capable of outputting visible information to a user of computing device 10.

UID 12 may include a presence-sensitive display that may receive tactile input from a user. UID 12 may receive indications of tactile input by detecting one or more gestures from a user (e.g., as a user touches or points to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces related to the functionality of computing platforms, operating systems, applications, and/or services executing at or accessible by computing device 10 (e.g., electronic message applications, Internet browser applications, mobile or desktop operating systems, etc.). A user may interact with a user interface to cause computing device 10 to perform operations relating to functions (e.g., to access one or more data files using computing device 10).

Computing device 10 may include user interface ("UI") module 20, file manager module 22, and file identifier module 24. Modules 20, 22, and 24 may perform operations described using hardware, software, firmware, or a mixture of hardware, software, and firmware residing in and/or executing at computing device 10. Computing device 10 may execute modules 20, 22, and 24 with one or more processors. Computing device 10 may execute modules 20, 22, and 24 as one or more virtual machines executing on underlying hardware of computing device 10. Modules 20, 22, and 24 may execute as one or more services or components of operating systems or computing platforms of computing device 10. Modules 20, 22, and 24 may execute as one or more executable programs at application layers of computing platforms of computing device 10. UID 12 and modules 20, 22, and 24 may be otherwise arranged remotely to and remotely accessible by computing device 10, for instance, as one or more network services operating at network 30 in a network cloud.

UI module 20 may cause UID 12 to output user interface 14 (or other example user interface) for display, as a user of computing device 10 views output and/or provides input at UID 12. UI module 20 and UID 12 may receive one or more indications of input from a user as the user interacts with user interface 14, at different times and when the user and computing device 10 are at different locations. UI module 20 and UID 12 may interpret inputs detected at UID 12 (e.g., as a user provides one or more gestures at one or more locations of UID 12 at which user interfaces 14 are displayed) and may relay information about the inputs detected at UID 12 to one or more associated platforms, operating systems, applications, and/or services executing at computing device 10, to cause computing device 10 to perform functions. For instance, while in proximity to an office location, a user of computing device 10 may interact with user interface 14 by providing input at UID 12 to predominantly access one or more work related data files. UI module 20 and UID 12 may receive indications of the input and process the input as input related to user interface 14. UI module 20 may send data associated with the received input to file manager module 22 for further interpretation.

UI module 20 may receive information and instructions from one or more associated platforms, operating systems, applications, and/or services executing at computing device 10 (e.g., file manager module 22, etc.) for generating user interfaces 14. In addition, UI module 20 may act as an intermediary between the one or more associated platforms, operating systems, applications, and/or services executing at computing device 10 and various output devices of computing device 10 (e.g., speakers, LED indicators, audio or electrostatic haptic output device, etc.) to produce output (e.g., a graphic, a flash of light, a sound, a haptic response, etc.) with computing device 10.

In the example of FIG. 1, user interface 14 is a graphical user interface associated with a file system of computing device 10. User interface 14 includes graphical indications of stacks 16A through 16N (collectively, "stacks 16") and graphical indications of data files 18A-18C (collectively, "data files 18").

Each of stacks 16 represents a graphical representation of a grouping or "stack" of two or more data files that each share one or more common attributes. For example each data file in stack 16A may share a common location tag, user author tag, portion of content, etc. In some instances, the data files of each of stacks 16 may share a common association with an application, platform, or service executing at computing device 10. In some examples, the data files of each one of stacks 16 may be stored within a common directory of a file system or at a common hierarchical level of a file system.

Each of data files 18 represents a data file that computing device 10 identifies or predicts to be accessed by a user of computing device 10 at a particular time. Dotted arrows (which in some examples may or may not be displayed by UID 12) indicate from where (e.g., which one of stacks 16) that each of data files 18 originated. For example, UI module 20 may cause UID 12 to output graphical indications of data files 18A and 18B that each originate from stack 16A and UI module 20 may cause UID 12 to output a graphical indication of data file 18C that originates from stack 16N. In some examples, each graphical indication of data files 18 may appear to "peek" out from a corresponding one of stacks 16. In other words, each graphical indication of data files 18 may appear within user interface 14 as a card that appears at least partially separated from a corresponding one of stacks 16 to indicate to a user of computing device 10 which of data files 18 that computing device 10 identifies or predicts may be accessed by the user at a particular time.

User interface 14 may include various other types of graphical indications such as visual depictions of data file content, data file attributes, etc. UI module 20 may receive graphical information (e.g., text data, images data, etc.) for presenting user interface 14 as input from file manager module 22 along with instructions from file manager module 22 for presenting the graphical information as graphical indications of stacks 16 and data files 18 within user interfaces 14 at UID 12. Based on the graphical information and the instructions received from file manager module 22, UI module 20 may cause UID 12 to present graphical indications of stacks 16 and data files 18 within user interfaces 14 to alert a user of computing device 10 to one or more data files that computing device 10 identifies or predicts, based on contextual information received by computing device 10, may be accessed at a particular time.

File manager module 22 may perform operations for accessing (e.g., reading, writing, etc.), managing, and otherwise handling the storage and/or retrieval of individual data files that are accessible by computing device 10 and that may be stored locally at computing device 10 and/or remotely to computing device 10 (e.g., at information server system 60). For example, file manager module 22 may manage a file system as part of an underlying operating system or computing platform executing at computing device 10. File manager module 22 may cause UI modules 20 to output graphical indications of the one or more data files for display, as part of a user interface (e.g., user interface 14). File manager module 22 may interpret input associated with user interface 14 and in response to the input, cause computing device 10 to perform operations (e.g., read, write, etc.) on one or more of the data files based on the input.

File manager module 22 may access one or more data files stored by information server system 60 by at least transmitting commands over network links 32 that cause information server system 60 to perform corresponding operations (e.g., read, write, etc.) on the one or more data files maintained by remote file service module 62. File manager module 22 may receive, from remote file service module 62, indications (e.g., network data packets, messages, file names, file locations in a memory, etc.) of the one or more data files stored by information server system 60. File manager module 22 may cause UI module 20 to generate, using the indications, a graphical user interface of a file system (e.g., user interface 14) and cause UI module 20 to output user interface 14 for display at UID 12.

As described in further detail below, responsive to outputting indications of one or more data files to file identifier module 24, file manager module 22 may receive information from file identifier module 24 that indicates the one or more data files that file identifier module 24 identifies or predicts may be accessed by a user of computing device 10 at a particular time. File manager module 22 may cause UI module 20 to output graphical indications of the one or more data files that file identifier module 24 determines may be accessed by a user at a particular time.

As used throughout the disclosure, the term "data file" is used to describe portions of information associated with the execution of various platforms, applications, and services executing within an execution environment at one or more computing devices, such as computing device 10 and computing devices 8. For example, a data file may include a content portion that contains information associated with a word processing document, a presentation file, an e-mail message, an image, a song, etc. The content portion of the data file may include instructions that cause a processor of a computing device to perform operations for producing output (e.g., a graphic, a sound, etc.) that can be interpreted by a user (e.g., users 2 and 4) of the computing device. Each data file may have one or more attributes that specify particular characteristics of the data file and the content associated with the data file. For instance, an attribute of a data file may specify a date and/or time that the data file was created, one or more identifiers of devices or users associated with devices that authored the data file, a file type or file extension attribute specifying the type of information or application, platform, operating system, etc. which can be used to access the data file. These are just some example file attributes and one of ordinary skill in the art understands that many other types of data file attributes may exist.

An indication of a data file is used to describe a file identifier or other information that a computing device and/or computing system uses to specify a particular file. For instance, an indication of a data file may be the actual data file, the name of a data file, the location of a data file in a memory, etc. A graphical indication of a data file is used to describe a graphic, image, or other visual representation of a data file. For instance, a graphical indication of a data file may be an icon, a character string, or other visual depiction of an indication of a data file being presented at a screen, such as by computing device 10 at UID 12.

File identifier module 24 may identify or predict one or more data files that a user of computing device 10 are likely to be accessed by the user at a particular time. In other words, file identifier module 24 may determine which one or more data files, being managed by file manager module 22, are "contextually related" to a determined context of a user and computing device 10. File identifier module 24 may identify data files that file identifier module 24 identifies or predicts will be accessed by the user using computing device 10 at a particular time based on contextual information received by computing device 10. The contextual information that computing device 10 receives may include contextual information associated with computing devices 8 and 10 and/or respective users of computing devices 8 and 10. File identifier module 24 may include a device proximity detection capability, a context identifier capability, and a file attribute comparator capability for identifying or predicting one or more data files that a user of computing device 10 may which to access at a particular time.

File identifier module 24 may include a device proximity detection capability for identifying computing devices 8 that are within a distance threshold of the location of computing device 10. For example, file identifier module 24 may determine locations associated with computing devices 8 and 10 and compare the determined locations of computing devices 8 and 10 to determine whether computing device 10 is in proximity (e.g., within a threshold distance) to any of computing devices 8. In some examples, the threshold distance may be a fixed distance, a relative distance, an adjustable (e.g., user defined) distance, etc. In other words, computing device 10 may utilize a threshold distance that is fixed or changing to determine whether any of computing devices 8 is close enough to the location of computing device 10 to warrant the display of identified or predicted data files that a user may wish to access at a particular time.

File identifier module 24 may include context identification capabilities for determining a context associated with a user of computing device 10 and/or one or more users of computing devices 8. In other words, file identifier module 24 may process contextual information received by computing device 10 and use the contextual information to generate a context of the user of computing device 10 that specifies one or more characteristics associated with the user of computing device 10 and his or her physical surroundings at a particular time (e.g., location, name, address, and/or type of place, building, etc., weather conditions, traffic conditions, calendar information, meeting information, event information, etc.). For example, a context of a user may specify that a user is at a particular place (e.g., at work, at home, at a business, at a location on a map, at a coordinate location, etc.), performing a particular activity (e.g., in a meeting, at dinner, riding a bicycle, commuting in a car, playing in a sporting event, attending a movie or concert, etc.), or generally indicate where and/or what a user may be doing at a particular time. File identifier module 24 may determine whether any of the data files managed by file manager module 22 are associated with the context of the user of computing device 10 and/or related to nearby users of computing devices 8 to determine whether any of the data files are "contextually relevant."

As used herein, a data file may be contextually relevant if the data file has content, one or more attributes, and/or one or more characteristics that are related to a particular time, location, event, meeting, or other characteristic associated with a user of a computing device and defined by a context of the user. For example, a data file may have a location tag that indicates a place (e.g., a location) where the file was first created and/or last accessed by a computing device. File identifier module 24 may determine that a data file is contextually relevant when a context of a user of computing device 10 corresponds to the place at which the file was created and/or last accessed by a computing device. In some examples, contextually relevant may indicate that a data file is related to a context of a user of a computing device in time, location, or other characteristic associated with the user.

File identifier module 24 may include file attribute comparator capabilities that determine which data files have attribute(s) related to the current context of a user of computing device 10 and users of nearby computing devices 8 at a particular time. For example, file identifier module 24 may determine one or more data files that are authored and/or shared between the user of computing device 10 and at least one user associated with one or more proximate computing devices 8.

File identifier module 24 of computing device 10 may only collect or make use of information associated with a user of computing device 10 after first providing the user with an opportunity to provide input at computing device 10 to control whether programs or features of computing device 10 can collect and make use of user information (e.g., information about a user's current location, current speed, etc.), or to dictate whether and/or how computing device 10 receives content that may be relevant to the user. In addition, certain data may be treated in one or more ways before it is stored or used by computing device 10 so that personally-identifiable information is removed.

In operation, file identifier module 24 of computing device 10 may determine a location of computing device 10 at a particular time. For instance, file identifier module 24 may receive contextual information associated with computing device 10 and determine a location of computing device 10 based on the contextual information.

File identifier module 24 may receive Bluetooth, GPS, cellular, near-filed-communication (NFC), Wi-Fi, and/or other communication data received by a communications unit of computing device 10 and determine a coordinate location of computing device 10. In some examples, file identifier module 24 may determine a relative location (e.g., an address, a place, a country, a city, a type of building, a business, etc.) of computing device 10 and/or determine a location of computing device 10 based on signal triangulation (e.g., a technique for determining a single location based on relative position data received from two or more signals). In other examples, file identifier module 24 may determine a location of computing device 10 by determining a network identifier of a computer network (e.g., network 30) from which computing device 10 transmits and receives communication data and comparing the network identifier to a database of network identifiers and locations.

Responsive to determining that at least one of computing devices 8 is proximate to computing device 10 or within a threshold distance from the location of computing device 10, file identifier module 24 may identify or predict, based on contextual information associated with a user of computing device 10 and contextual information associated with a user of the nearby or proximate computing devices 8, at least one data file that the user of computing device 10 is likely to access at the particular time. For example, file identifier module 24 may determine, based on contextual information associated computing devices 8, that one or more of computing devices 8 is located within a threshold distance of the location of computing device 10 at the particular time.

In some examples, a threshold distance may correspond to a physical distance (e.g., one square meter, one city block, ten feet, etc.). In other examples, a threshold distance may correspond to a duration, a time of travel, or a travel time (e.g., five minutes of travel time, one hour of travel time, one leg of a public transportation route, etc.) for a person or machine to move from a location of computing device 10 to a location of computing devices 8. In some examples, a threshold distance may correspond to a maximum range associated with a wired and/or wireless communication signal or transmission medium (e.g., range associated with a Wi-Fi signal, Bluetooth signal, Near-Field-Communication signal, radio signal, fiber, etc.). File identifier module 24 may determine that one of computing devices 8 is nearby or proximate to computing device 10 if the location of computing device 10 is less than a threshold distance away from one of computing devices 8.

File identifier module 24 may receive communication data as contextual information (e.g., Wi-Fi, Bluetooth, Near-Field-Communication, or other wireless signal data) via link 32Y from one or more computing devices 8 and determine coordinates and/or relative locations of each of the one or more computing devices 8 based on the communication data. In some examples, file identifier module 24 may determine relative locations (e.g., an address, a place, a country, a city, a type of building, a business, etc.) of computing devices 8 and/or determine locations of computing devices 8 based on signal triangulation techniques.

In some examples, file identifier module 24 may determine locations of computing devices 8 based on contextual information received from information server system 60 in response to a request for such information from file identifier module 24. For example, file identifier module 24 may receive a coordinate location and/or a relative location associated with one or more of computing devices 8 from information server system 60. File identifier module 24 may determine the locations of computing devices 8 are within a threshold distance of the location of computing device 10 (i.e., in physical proximity to each other).

In instances where file identifier module 24 determines that computing device 10 and at least one of computing devices 8 are in physical proximity, file identifier module 24 of computing device 10 may determine a context associated with a user of computing device 10. The context may specify one or more characteristics associated with the user of computing device 10 and may be indicative of what and/or where a user may be performing an action (e.g., whether the user is likely in a meeting at a work location, at a social event at a public place, at his or her home, etc.). File identifier module 24 may determine, based on the context, one or more data files managed by file manager module 22 of which the user of computing device 10 is likely to access at the particular time. Said differently, file identifier module 24 may identify, based on the contextual information associated with the user of computing device 10 and/or the user of nearby computing devices 8, at least one data file that is identified or predicted to be accessed by the user of computing device 10 at the particular time.

File identifier module 24 may determine which of the data files that are contextually related to the users of the nearby computing devices 8 by determining whether any of the data files has an attribute associated with the determined context of the user of computing device 10. For example, file identifier module 24 may identify a data file with a location tag that corresponds to the location of computing device 10 as a contextually relevant data file.

File identifier module 24 may determine whether any of the data files being managed by file manager module 22 are shared between users of computing devices 8 that are proximate to the user of computing device 10. For example, file identifier module 24 may determine that at least one data file has an attribute specifying that the users associated with the nearby computing devices 8 last accessed the at least one data file at an earlier time and identify or predict that the user of computing device 10 may wish to access the at least one data file at the current time. Said differently, file identifier module 24 may determine whether any of the users of nearby computing device 8 are co-collaborators or authors associated with any of the data files and/or whether the users of nearby computing devices 8 and the user of computing device 10 at least accessed any of the same data files at a time prior or earlier than the particular time.

In some examples, file identifier module 24 may determine that the context of the user of computing device 10 indicates that the user of computing device 10 is at a work place meeting. File identifier module 24 may infer that, due to the locations of one or more computing devices 8, the users of nearby computing devices 8 are also attending the work place meeting with the user of computing device 10. File identifier module 24 may identify one or more of the data files that have attributes and/or content portions (e.g., subjects, descriptions, etc.) that contain keywords associated with the subject, description, and/or agenda contained in a calendar entry associated with the meeting as being one or more data files that the user of computing device 10 may need to access at the particular time.

Responsive to identifying or predicting at least one data file that is likely to be accessed by the user of computing device 10 at the particular time, file identifier module 24 may output an indication of the at least one data file to file manager module 22. File manager module 22 may cause UI module 20 to output for display (e.g., present) one or more graphical indications of the at least one data file that is likely to be accessed by the user at the particular time. UI module 20 may cause UID 12 to update the presentation of user interface 14 at UID 12 to include graphical indications data files 18A-18C to indicate visually that the three files 18A-18C may be of most interest to the user of computing device 10 at the particular time.

In some examples, file manager module 22 may cause UI module 20 to output graphical indications of the identified data files 18A-18C in response to an input detected by UI module 20 at UID 12 (e.g., as user gestures at a location of UID 12) to request that computing device 10 present "nearby" data files. In some examples, responsive to computing device 10 determining that at least one of computing devices 8 is proximate to computing device 10, file identifier module 24 and file manager module 22 may cause UI module 20 to apply a "peeking" effect the graphical indications of stacks 16. Said differently, upon identifying the one or more contextually related data files, modules 22 and 24 may cause UI module 20 to visually display graphical indications of data files 18 as cards of stacks 16 that are slightly sliding outward from stacks 16 (e.g., in either a vertical and/or horizontal direction away from stacks 16) to graphically indicate which data files 18 of stacks 16 include content and/or have attributes relating to the context of the user of computing device 10 and the context of one or more users of nearby computing devices 8.

In this manner, rather than require a user to search and sift through a large quantity of data files to identify the individual data files that the user wishes to access using a computing device at a particular time, the computing device, according to the techniques of this disclosure, may automatically identify or predict which individual data files that the user is identified or predicted to access at the particular time and may output a graphical indication of the identified or predicted data files for display. That is, in some examples, if the computing device determines that user of the computing device and the other users are physically proximate to one another (e.g., in a collaborative environment), rather than require the user to navigate through a graphical user interface (e.g., of a file system) using the computing device to view, edit, or otherwise access one or more data files, the computing device may output a graphical indication of the one or more data files that the computing device predicts will be accessed by the user when collaborating with the other users, at the particular time.

By automatically presenting indications of contextually related data files, the user may spend less time and provide fewer inputs when searching for data files using the computing device according to these techniques. In spending less time searching and providing fewer inputs at a computing device, the computing device may perform fewer operations in response to user input, consume less electrical power, and preserve battery life.

Figure 2:
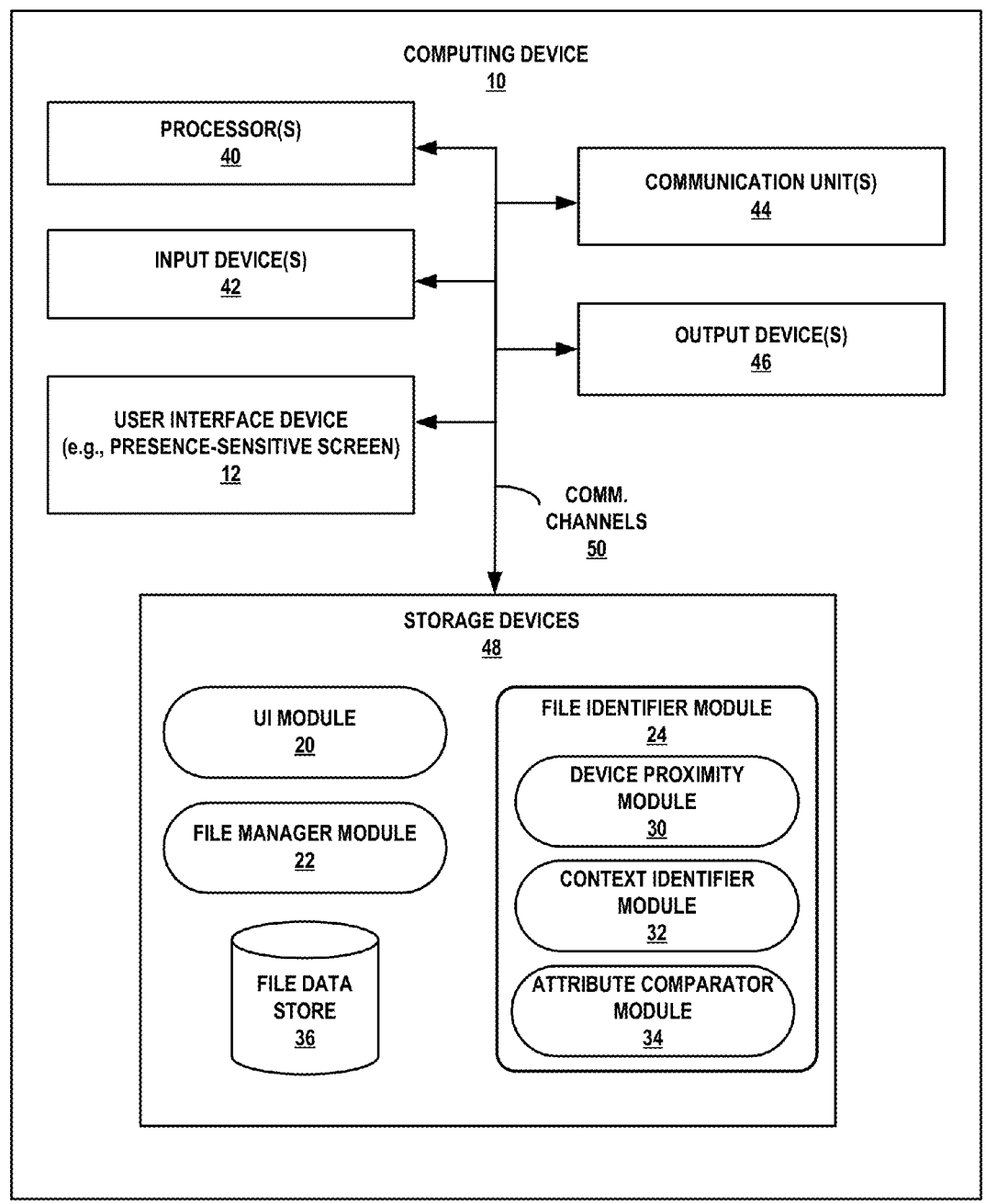
FIG. 2 is a block diagram illustrating an example computing device configured to identify one or more data files that may be of interest to a user, in accordance with one or more aspects of the present disclosure.

FIG. 2 is a block diagram illustrating an example computing device configured to identify one or more data files that may be of interest to a user, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, file manager module 22, file identifier module 24, and file data store 36. UI module 20, file manager module 22, and file identifier module 24 may rely on information stored as one or more data files at file data store 36 stored at storage device 48. In other words, as is described in more detail below, file manager module 22 may be operable by processors 40 to perform read/write/etc. operations on information (e.g., data files) stored at file data store 36, at storage device 48. File identifier module 24 includes device proximity module 30, context identifier module 32, and attribute comparator module 34.

Communication channels 50 may interconnect each of the components 12, 20, 22, 24, 30, 32, 34, 36, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone, or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., file data store 26) that modules 20, 22, 24, 30, 32, and 34 may access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20, 22, 24, 30, 32, 34 and file data store 36.

One or more processors 40 may implement functionality and/or execute instructions within computing device 10. For example, processors 40 on computing device 10 may receive and execute instructions stored by storage devices 48 that execute the functionality of modules 20, 22, 24, 30, 32, 34. These instructions executed by processors 40 may cause computing device 10 to read/write/etc. information, such as one or more data files at file data store 36 and stored within storage devices 48 during program execution. Processors 40 may execute instructions of modules 20, 22, 24, 30, 32, 34 to cause UID 12 to output a one or more graphical indications of identified or predicted data files for display at UID 12 as content of user interface 14. That is, modules 20, 22, 24, 30, 32, 34 may be operable by processors 40 to perform various actions or functions of computing device 10, for instance, causing UID 12 to present user interface 14 at UID 12.

Device proximity module 30 of file identifier module 24 may perform operations for identifying one or more computing devices that are within a threshold distance of the location of computing device 10. For instance, device proximity module 30 may process contextual information received from computing devices 8 and determine which of computing devices 8 that are within a threshold distance of the location of computing device 10.

In some examples, device proximity module 30 of file identifier module 24 may determine whether any of computing devices 8 are within a threshold distance of computing device 10 by analyzing the types of communication signal received over link 32Y from computing devices 8. Device proximity module 30 of file identifier module 24 may infer that if a communication signal is received from one of computing devices 8, than computing device 10 is at least within a maximum range associated with a type (e.g., Bluetooth, Wi-Fi, cellular, etc.) of the communication signal.

For example, a Bluetooth communication signal may have a maximum detectable range (e.g., one meter, ten meters, etc.). Device proximity module 30 of may determine that if computing device 10 receives Bluetooth communication signals from computing devices 8A, that computing device 8A is at least less than the maximum range of the Bluetooth communication signal (e.g., less than or equal to one meter, ten meters, etc.). Device proximity module 30 of may use similar techniques with regard to other types of communication signals (e.g., Wi-Fi, cellular, etc.). For example, if device proximity module 30 determines that computing device 10 receives a Wi-Fi, cellular, or other type of signal from one of computing devices 8 than the physical distance between the one of computing devices 8 and computing device 10 is at least less than or equal to the maximum range. In other words, device proximity module 30 of computing device 10 may detect a wireless communication signal associated with one of computing devices 8, determine, based on the wireless communication signal, a maximum detectable range associated with the wireless communication signal, and responsive to determining that the maximum detectable range does not exceed a threshold distance, determine that the second computing device is located within the threshold distance of the location of the first computing device at the particular time.

In some examples, the contextual information that computing device 10 receives may include ambient audio data captured by respective microphones of computing devices 8 and computing device 10 (e.g., using one of input devices 42) at the particular time. Device proximity module 30 may correlate portions of the ambient audio received by each device to determine whether or not any one of computing devices 8 captured similar sounds data as computing device 10 at a particular time. Responsive to identifying corresponding portions of the ambient audio data detected by computing device 10 and one of computing devices 8, device proximity module 30 may determine that the one of computing devices 8 from which the corresponding ambient audio was detected is located within a threshold distance of the location of the computing device 10 at the particular time.

In some examples, device proximity module 30 may perform other types of techniques for determining whether computing device 10 is located near or within a physical proximity to one or more of computing devices 8. For example, device proximity module 30 of computing device 10 may detect a common beacon provided by computing device 10 and each of computing devices 8. When device proximity module 30 of computing device 10 detects the common beacon, device proximity module 30 may determine that computing device 10 is co-located or in proximity to the respective one of computing devices 8 associated with the detected beacon.

In some examples, computing devices 8 and 10 may perform "direct peer-to-peer" communication using ultrasonic signals. When device proximity module 30 detects one or more ultrasonic signals from one of computing devices 8, device proximity module 30 may determine that the one of computing devices 8 that transmits the ultrasonic signals is co-located or in proximity to or within a distance threshold of computing device 10.

In some examples, device proximity module 30 may determine relative multiple nearby computing devices 8 and rank the nearby computing devices 8 from nearest to furthest. File identifier module 24 may determine one or more data files pertinent (e.g., related to) each of the multiple nearby computing devices 8. File identifier module 24 may output the ranking of the nearby computing devices 8 and the associated indications of pertinent files to file manager module 22. File manager module 22 may cause UI module 20 to present, a graphical indication of the pertinent data files associated with each one of nearby computing devices 8, in order based on the ranking In other words, file manager module 22 may cause UI module 20 to output a user interface (e.g., user interface 14) for display at UID 12 that not only indicates which one or more data files that computing device 10 predicts may be accessed by a user at a particular time, but also indicates which of the one or more data files is associated with one of computing devices 8 that is closer in distance to computing device 10 and one of computing devices 8 that is further away from computing device 10.

In other words, in some examples, after identifying or predicting a first data file based on the relative proximity of computing device 8A, computing device 10 may be configured to determine that computing device N is located within the threshold distance of the location of computing device 10 at the particular time, and determine a ranking associated with computing devices 8A and 8N (e.g., rank computing devices 8A and 8N in order of proximity from nearest to computing device 10 to farthest away from the location of computing device 10). The ranking may be based on distance from the location of computing device 10. Computing device 10 may predict, based on contextual information associated with the user of computing device 10 and contextual information associated with a user of computing device 8N, a second data file that the user of computing device 10 is likely to access at the particular time. Computing device 10 may cause UID 12 to output, for display and based on the ranking, a graphical indication of the first data file identified or predicted to be accessed by the user of the first computing device at the particular time and the second data file identified or predicted to be accessed by the user of the first computing device at the particular time.

Context identifier module 32 of file identifier module 24 may perform operations for determining a context associated with a user of computing device 10 and/or one or more users of computing devices 8. In other words, context identifier module 32 may process contextual information received by computing device 10 and use the contextual information to generate a context of the user of computing device 10 that specifies one or more characteristics associated with the user of computing device 10 and his or her physical surroundings at a particular time (e.g., location, name, address, and/or type of place, building, etc., weather conditions, traffic conditions, calendar information, meeting information, event information, etc.). Context identifier module 32 may determine whether any of the data files managed by file manager module 22 are associated with nearby users of computing devices 8 to determine whether any of the data files are contextually relevant.

In some examples, context identifier module 32 may determine a context associated with a user of computing device 10 (e.g., specifying a location, a time, an event, an activity, etc.) based on contextual information received from computing devices 8 over network 30. For example, context identifier module 32 may determine that a user of computing device 10 is in a collaboration session (e.g., a meeting, etc.) when context identifier module 32 receives various short range communication signals from multiple computing devices 8 that are associated with users in a contact list associated with a user of computing device 10. For instance, context identifier module 32 may determine a user identifier (e.g., a name, a phone number, etc.) associated with one or more short range wireless communication signals received from computing devices 8 and perform a lookup of the user identifiers within an electronic address book associated with the user of computing device 10 to determine whether any of the users of nearby computing devices 8 may be known associates, colleagues, family members, friends, etc. of the user of computing device 10.

In some examples, context identifier module 32 may determine a context of a user of computing device 10 based on contextual information associated with computing devices 8 that context identifier module 32 receives from device context module 64 of information server system 60, over network 30. For example, context identifier module 32 may receive data from device context module 64 indicating that respective calendars associated with one or more users of computing devices 8 indicated the users of computing devices 8 are at a dinner party and context identifier module 32 may infer that the user of computing device 10 is also at the dinner party when device proximity module 30 determines that the computing devices 8 are within a threshold distance of computing device 10.

In some examples, file identifier module 24 may receive contextual information from computing devices 8 and 10 in substantially real-time. In other examples, file identifier module 24 may receive contextual information from computing devices 8 and 10 at various earlier times and use the earlier information to learn and produce rules (e.g., using artificial intelligence or machine learning techniques) for discerning which one or more data files are identified or predicted to be accessed by a user using computing device 10 at a later, particular time.

Attribute comparator module 34 of file identifier module 24 may perform operations for determining which one or more data files has at least one attribute related to the current context of a user of computing device 10 and users of nearby computing devices 8. Attribute comparator module 34 may parse file data store 36 to identify one or more data files that may be of interest to a user of computing device 10 at the particular time. Responsive to determining one or more data files from file data store 36 that have at least one attribute related to the current context of the user of computing device 10 and users of nearby computing devices 8 (as determined by device proximity module 30), attribute comparator module 34 of file identifier module 24 may output, for transmission to file manager module 22, one or more indications of the one or more data files as identified or predicted data files that the user of computing device 10 may likely access at the particular time.

For example, attribute comparator module 34 of file identifier module 24 may determine one or more data files that are authored, shared, viewed, and/or accessed by the user of computing device 10 and at least one user associated with one or more nearby computing devices 8 at an earlier time. In other words, attribute comparator module 34 may determine that an attribute (e.g., an author tag, a permissions tag, etc.) of at least one data file indicates that the user of computing device 10 and one or more users of computing device 8 each accessed the at least one data file at a time prior to the particular time, and predict, based on the attribute, the at least one data file.

In some examples, file identifier module 24 may identify or predict at least one data file that the user of computing device 10 is likely to access at a particular time by at least responsive to detecting a wireless communication signal associated with at least one of computing devices 8, determining, based on the wireless communication signal, a device identifier associated with the at least one of computing devices 8 and determining, based on the device identifier associated with the at least one of computing devices 8 that an attribute of the at least one data file indicates that the at least one computing device 8 previously accessed the at least one data file at an earlier time prior to the particular time. For example, attribute comparator module 34 of file identifier module 24 may parse file data store 36 for one or more data files that have an attribute indicating that a computing device with a matching device identifier to one of the nearby computing devices 8 last accessed or at least previously accessed the data file and cause file identifier module 24 to output an indication of the data file to file manager module 22 as a identified or predicted data file that the user of computing device 10 may access at the particular time.

In some examples, attribute comparator module 34 may parse file data store 36 for one or more data files which have an attribute indicating that a user identifier (e.g., name, phone number, e-mail address, etc.) associated with a nearby computing device 8 previously accessed the data file. Attribute comparator module 34 may cause file identifier module 24 to output an indication of the one or more data files of file data store 36 that have an attribute indicating that a user identifier associated with a nearby computing device 8 previously accessed the data file to file manager module 22. In other words, attribute comparator module 34 may determine, based on the contextual information associated with a user of at least one of computing devices 8, a user identifier associated with the user of the at least one of computing devices 8, and identify, based on the user identifier associated with the user of the at least one of computing devices 8, that an attribute of the at least one data file indicates that the user of at least one of computing devices 8 previously accessed the at least one data file at an earlier time prior to the particular time.

Figure 3:
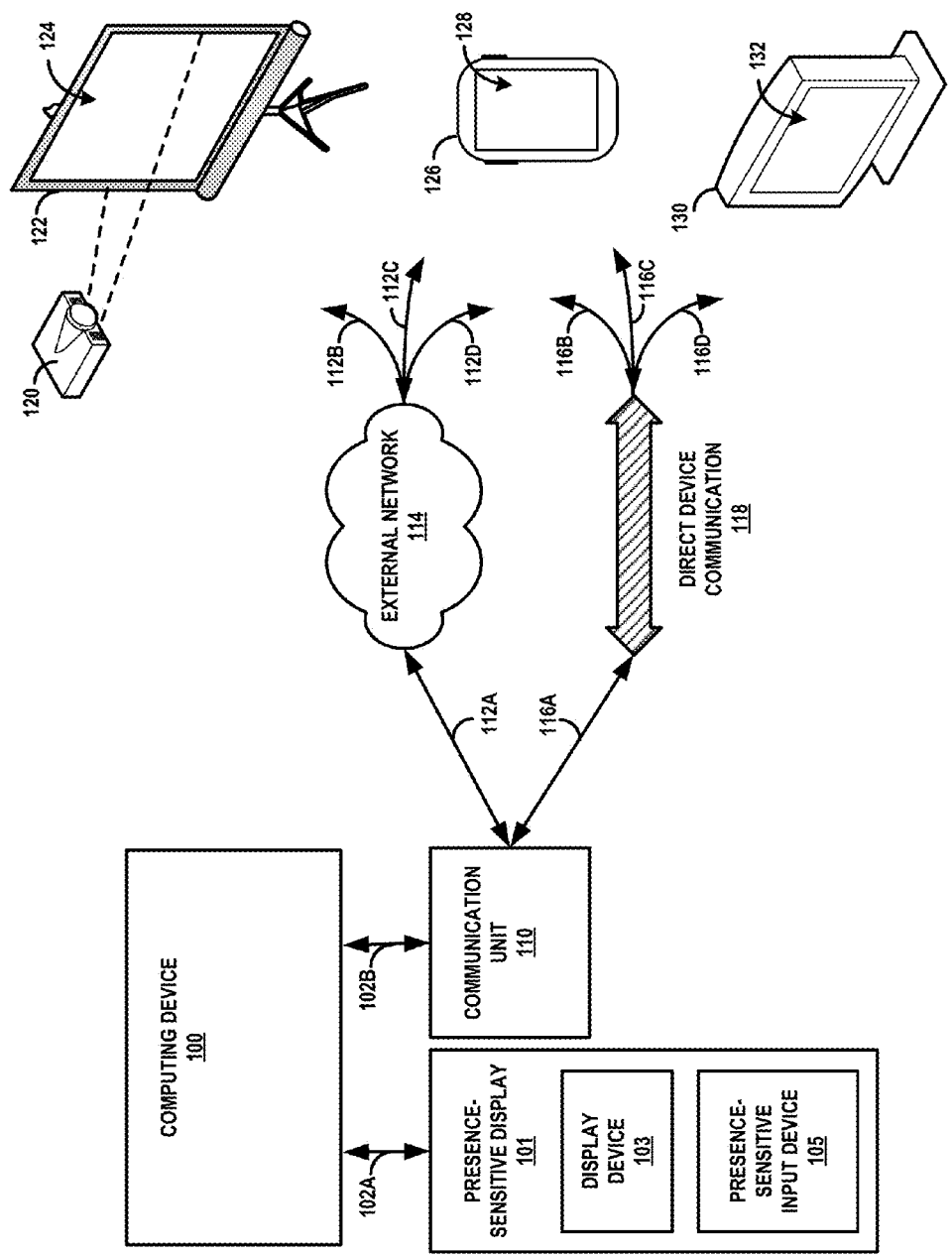
FIG. 3 is a block diagram illustrating an example computing device that outputs graphical content for display at a remote device, in accordance with one or more techniques of the present disclosure.

FIG. 3 is a block diagram illustrating computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 and FIG. 2 as a single stand-alone computing device 10, a computing device such as computing device 10, and computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIG. 1 and FIG. 2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may determine a location of computing device 100 at a particular time and responsive to determining that one or more other computing devices are located within a threshold distance of the location of computing device 100, computing device 100 may identify or predict at least one data file that a user of computing device 100 is likely to access at the particular time. For example, computing device 100 may receive information from device context module 64 of information server system 60 indicating that computing device 8A is within a three meter radius of the location of computing device 100. Computing device 100 may obtain device identifier information associated with computing device 8A and determine a user identifier (e.g., telephone number, e-mail address, person's name, etc.) associated with computing device 8A. Computing device 100 may determine which one or more data files that are accessible to the user of computing device 10 and have attributes related to the user identifier of computing device 8A. For example, computing device 100 may identify one or more word processing, spreadsheet, presentation, image, etc. data files that are co-authored or were previously accessed by the user of computing device 100 and the user indicated by the user identifier of computing device 8A. Computing device 100 may identify or predict that the user of computing device 10 is likely to access the one or more data files at the particular time.

Computing device 100 may output, for display, a graphical user interface comprising a plurality of graphical indications of data files that are accessible to the user of computing device 100 at the particular time. The plurality of graphical indications may include the graphical indication of the at least one data file that is identified or predicted to be accessed by the user of computing device 100 at the particular time. The graphical indication of the at least one data file that is identified or predicted to be accessed by the user of computing device 100 at the particular time may be different from each, other graphical indication of the plurality of graphical indications.

For example, computing device 100 may output, for display, a graphical indication of user interface 14 to visual display device 130. The graphical indication of user interface 14 may include graphical indications of stacks 16 (e.g., one or more groupings of data files that a user can access at the particular time) and also include graphical indications of data files 18 (e.g., one or more data files that computing device 100 predicts that the user of computing device 100 is likely to access at the particular time.

Computing device 100 may output, for display, the graphical indication of user interface 14 via direct device communication 118 or external network 114 to display device 130. In some examples, display device 130 outputs the graphical indication of user interface 14 for display to the user of computing device 100. The user of computing device 100 may, in turn, interact with user interface 14 to cause computing device 100 to perform operations on the identified or predicted data files. Computing device 100 and display device 130 may be configured such that selection of a particular one of the displayed graphical indications of user interface 14, may cause computing device 100 to perform read/write/etc. operations on the identified or predicted data files.

Figure 4:
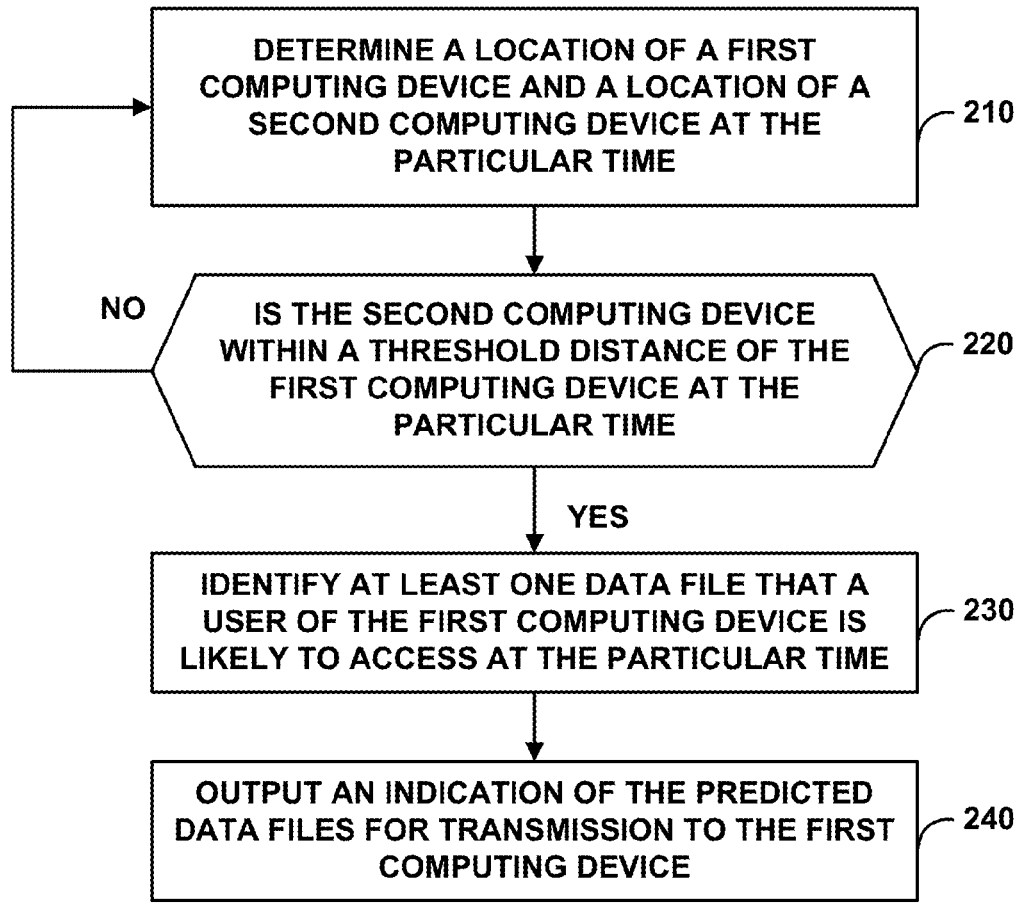
FIGS. 4 and 5 are flowcharts illustrating example operations of an example computing system that identify one or more data files that may be of interest to a user, in accordance with one or more aspects of the present disclosure.
Figure 5:
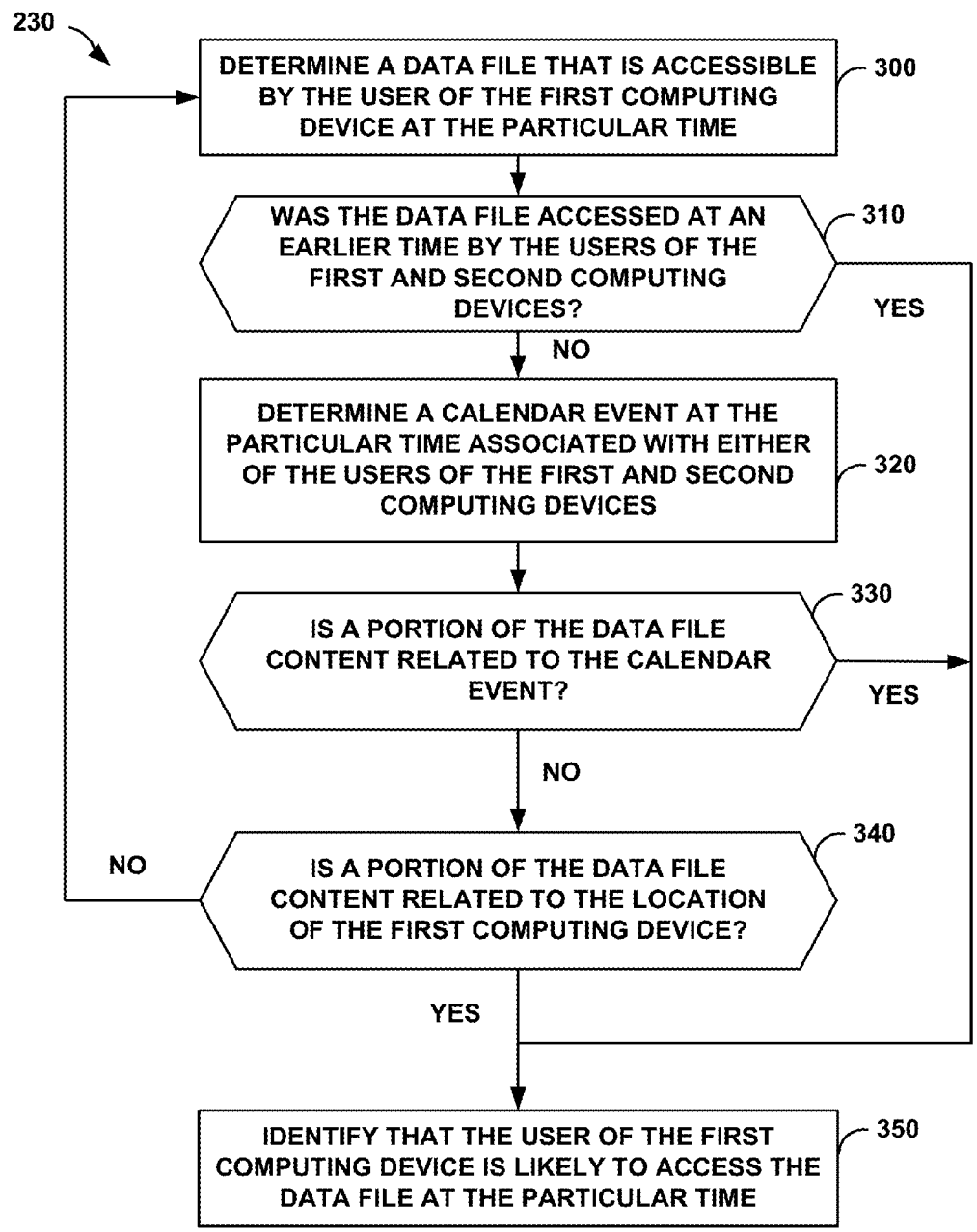

FIGS. 4 and 5 are flowcharts illustrating example operations of an example computing system configured to identify one or more data files that may be of interest to a user, in accordance with one or more aspects of the present disclosure. The processes of FIGS. 4 and 5 may be performed by one or more processors of a computing system, such as information server system 60 illustrated in FIG. 1 and FIG. 2. For purposes of illustration, FIGS. 4 and 5 are described below within the context of information server system 60, computing device 10, and system 1, illustrated in FIG. 1.

FIG. 4 illustrates that information server system 60 may determine a location of computing device 10 and a location of computing device 8A at a particular time (210). For example, remote file service module 62 of information server system 60 may incorporate some or all of the capabilities of file manager module 22 and file identifier module 24 of computing device 10 described above to identify or predict more data files that are likely to be accessed by a user of computing device 10 at a particular time. Remote file service module 62 may output for transmission to computing device 10, an indication (e.g., data, a pointer to data, etc.) of the one or more identified or predicted data files (e.g., such that file manager module 22 of computing device 10 can cause UI module 20 to present graphical indications of the identified or predicted data files for display at UID 12).

Remote file service module 62 may query device context module 64 for locations of computing devices 8 and 10. Device context module 64 may interpret global positioning system (GPS) data, perform triangulation techniques, or otherwise determine a location or position of each of computing devices 8 and 10 and output the locations to remote file service module 62.

Information server system 60 may determine whether computing device 8A is within a threshold distance of computing device 10 at a particular time (220). For example, using the location data that remote file service module 62 receives from device context module 64, remote file service module 62 may compute a physical distance separating computing device 10 and computing device 8A and determine whether computing device 8A is within a threshold distance to computing device 10 to begin identifying or predicting one or more data files related to computing devices 8A and 10 that a user of computing device 10 may be interested in accessing at the particular time.

If information server system 60 determines that computing devices 10 and 8A are within a threshold distance, information server system 60 may identify or predict at least one data file that a user of computing device 10 is likely to access at the particular time (230). For example, remote file service module 62 may pares the data files being managed and/or stored by information server system 60 to identify one or more files that have attributes (e.g., a device identifier) related to both computing device 10 and computing device 8A.

Information server system 60 may output an indication of the identified or predicted data files for transmission to computing device 10 (240). For instance, remote file service module 60 may transmit an indication (e.g., a data packet, a pointer to data, a file name, etc.) to computing device 10 over network 30 indicating to file manager module 22 of computing device 10 the one or more data files being managed and stored by information server system 60 that may be of interest to the user of computing device 10 at the particular time. File manager module 22 may share the one or more identified or predicted data files with UI module 20 of computing device 10 to cause UI module 20 to include a graphical indication of the one or more identified or predicted data files within user interface 14 at UID 12. UI module 20 may cause UID 12 of computing device 10 to output graphical indications of the one or more identified or predicted data files for display at UID 12 (e.g., within user interface 14).

FIG. 5 illustrates further operations of information server system 60. For instance, FIG. 5 shows an additional example of operations of information server system 60 that may be performed by information server system 60 from step 320 of FIG. 4. After determining that computing devices 10 and 8A are within a threshold distance of each other, information server system 60 may determine data files that information server system 60 predicts may be accessed by a user of computing device 10 at the particular time. I Information server system 60 may parse the one or more data files being managed and stored by remote file service module 62 to identify those one or more data files that are accessible to computing device 10 at the particular time (300). In other words, information server system 60 may identify at least a subset of the data files stored at information server system 60 to locate those files which computing device 10 can access via network 30 and interactions with remote file service module 62.

Information server system 60 may determine whether a data file was accessed at an earlier time by the users of computing devices 10 and 8A (310). For example, remote file service module 62 may determine, based on contextual information associated with the user of computing device 10 and/or contextual information associated with the user of computing device 8A, user identifiers associated with the users of computing devices 8A and 10. In other words, remote file service module 62 may determine a name, a phone number, an e-mail address, etc. indicating a respective identity of the users of computing devices 10 and 8A. Remote file service module 62 may determine, based on the user identifiers associated with the users of computing devices 10 and 8A, whether or not an attribute of the at least one data file indicates that the user of computing device 10 and/or the user of computing device 8A previously accessed the at least one data file at an earlier time prior to the particular time. If the attribute indicates that both the users of computing devices 10 and 8A accessed the data file at an earlier time, remote file service module 62 may identify or predict that the user of computing device 10 is likely to access the data file at the particular time (350).

Information server system 60 may determine a calendar event at the particular time associated with either of the users of computing device 10 and 8A (320). For example, device context module 64 may obtain calendar information associated with users of each of computing devices 10 and 8. Remote file service module 62 may query device context module 64 for information related to events or entries associated with the calendars of each of the users of computing devices 8 and 10 at or within a threshold time (e.g., five minutes, one hour, one day, etc.) of the particular time. Since remote file service module 62 may already have determined that computing devices 10 and 8A are in proximity (e.g., within a threshold distance), remote file service module 62 may infer that the users of computing devices 10 and 8A are attending the same event or activity associated with either user's calendar entry at the particular time.

Remote file service module 62 may compare the calendar entry or event associated with either one of the users of computing device 10 and 8A, to portions of content and/or attributes of data files managed by remote file service module 62 to identify one or more data files that may be related to the calendar entry at the particular time. Remote file service module 62 may determine whether a portion of the data file content is related to the calendar event or entry. If the data file content is related, remote file service module 62 may identify or predict that the user of computing device 10 is likely to access the data file at the particular time (350). In other words, responsive to determining that a portion of content of the at least one data file is related to a calendar event associated with at least one of the users of computing device 10 and computing device 8A and occurring at the particular time, remote file service module 60 may identify or predict the at least one data file as likely to be accessed by the user of computing device 10 at the particular time.

Information server system 60 may determine if a portion of content and/or attributes of data files managed by remote file service module 62 are related to the location of computing device 10 (340). In other words, remote file service module 62 may determine whether a portion of the data file content is related to the location for instance, if the data file has a location tag indicating that the file was created at the location of the computing device or if the data file has a portion of text-based content specifying the name, coordinate, or other identifier associated with the location. If the data file content is related to the location of computing device 10, remote file service module 62 may identify or predict that the user of computing device 10 is likely to access the data file at the particular time (350). In other words, responsive to determining that a portion of content of the at least one data file is related to the location of computing device 10 remote file service module 60 may identify or predict the at least one data file as likely to be accessed by the user of computing device 10 at the particular time.

Figure 6:
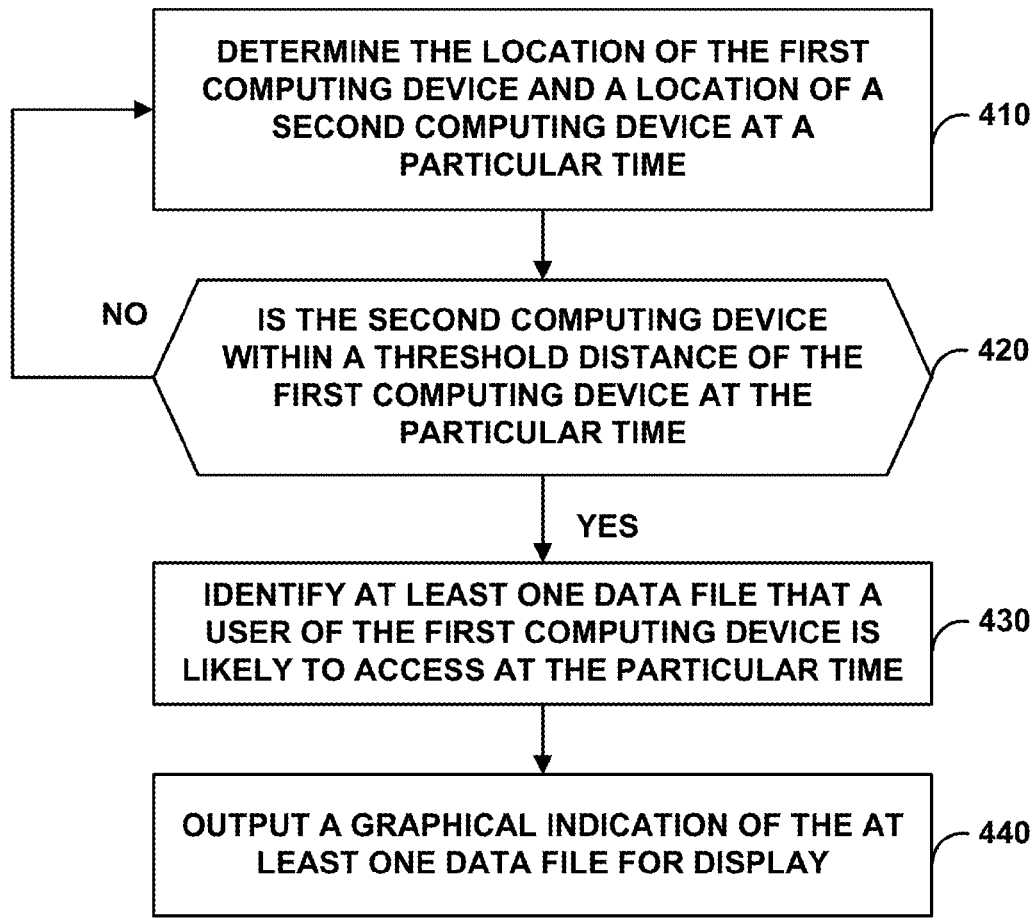
FIG. 6 is a flowchart illustrating example operations of an example computing device that identifies one or more data files that may be of interest to a user, in accordance with one or more aspects of the present disclosure.

FIG. 6 is a flowchart illustrating example operations of an example computing device that identifies one or more data files that may be of interest to a user, in accordance with one or more aspects of the present disclosure. The processes of FIG. 6 may be performed by one or more processors of a computing device, such as computing device 10 illustrated in FIG. 1 and FIG. 2. For purposes of illustration, FIG. 6 is described below within the context of information server system 60, computing device 10, and system 1, illustrated in FIG. 1.

FIG. 6 illustrates that a first computing device may determine the location of the first computing device and a location of a second computing device at a particular time. For example, device proximity module 30 of file identifier module 24 may receive contextual information associated with computing device 10 and computing device 8A at a current time. Device proximity module 30 may determine respective locations associated with each of computing devices 8 and 10 at the current time.

FIG. 6 shows that the first computing device may determine whether the second computing device is within a threshold distance of the first computing device at the particular time (420). For example, device proximity module 30 of file identifier module 24 may compare the coordinate locations associated with each of computing devices 8A and 10 and determine whether computing device 8A is within a threshold distance (e.g., one or more meters, one or more feet, etc.) of computing device 10 at the current time.

If the first computing device determines that the second computing device is within a threshold distance, the first computing device may identify or predict at least one data file that a user of the first computing device is likely to access at the particular time (430). For example, context identifier module 32 and attribute comparator module 34 of file identifier module 24 may pares the data files being managed and/or stored by file manager module 20 to identify one or more files that have attributes (e.g., a device identifier) related to both computing device 10 and computing device 8A. Context identifier module 32 and attribute comparator module 34 of file identifier module 24 may determine that the files which are related to both computing device 10 and computing device 8A are identified or predicted to be accessed by the user of computing device 10 at the current time.

The first computing device may output a graphical indication of the at least one data file for display (440). For instance, file identifier module 24 may transmit an indication (e.g., a data packet, a pointer to data, a file name, etc.) of the at least one data file identified or predicted to be accessed by the user of computing device 10 to file manager module 22. File manager module 22 may share the at least one identified or predicted data files with UI module 20 of computing device 10 to cause UI module 20 to include a graphical indication of the one or more identified or predicted data files within user interface 14 at UID 12. UI module 20 may cause UID 12 of computing device 10 to output graphical indications of the one or more identified or predicted data files for display at UID 12 (e.g., within user interface 14).

Clause 1. A method, comprising: determining, by a first computing device, a location of the first computing device at a particular time; responsive to determining that a second computing device is located within a threshold distance of the location of the first computing device at the particular time, identifying, by the first computing device and based on contextual information associated with a user of the first computing device and contextual information associated with a user of the second computing device, at least one data file that the user of the first computing device is likely to access at the particular time; and outputting, by the first computing device, for display, a graphical indication of the at least one data file.

Clause 2. The method of clause 1, wherein identifying the at least one data file comprises: determining, by the first computing device, that an attribute of the at least one data file indicates that the user of the first computing device and the user of the second computing device each accessed the at least one data file at a time prior to the particular time; and identifying, by the first computing device and based on the attribute, the at least one data file.

Clause 3. The method of any of clauses 1-2, wherein identifying the at least one data file comprises responsive to determining that a portion of content of the at least one data file is related to a calendar event associated with at least one of the user of the first computing device and the user of the second computing device, identifying, by the first computing device, the at least one data file, wherein the calendar event is associated with the particular time.

Clause 4. The method of any of clauses 1-3, wherein identifying the at least one data file comprises responsive to determining that a portion of content of the at least one data file is related to the location of the first computing device, identifying, by the first computing device, the at least one data file.

Clause 5. The method of any of clauses 1-4, wherein determining that the second computing device is located within a threshold distance of the location of the first computing device at the particular time further comprises: detecting, by the first computing device, a wireless communication signal associated with the second computing device; determining, by the first computing device, based on the wireless communication signal, a maximum detectable range associated with the wireless communication signal; responsive to determining that the maximum detectable range does not exceed a threshold distance, determining, by the first computing device, that the second computing device is located within the threshold distance of the location of the first computing device at the particular time.

Clause 6. The method of any of clauses 1-5, wherein identifying the at least one data file further comprises: responsive to detecting a wireless communication signal associated with the second computing device, determining, by the first computing device, based on the wireless communication signal, a device identifier associated with the second computing device; determining, by the first computing device, based on the device identifier associated with the second computing device, that an attribute of the at least one data file indicates that the second computing device previously accessed the at least one data file at an earlier time prior to the particular time; and responsive to determining that the attribute of the at least one data file indicates that the second computing device previously accessed the at least one data file at the earlier time prior to the particular time, determining, by the first computing device, that the at least one data file is likely to be accessed by the user of the first computing device at the particular time.

Clause 7. The method of any of clauses 1-6, wherein identifying the at least one data file further comprises: determining, by the first computing device, based on the contextual information associated with the user of the second computing device, a user identifier associated with at least one of the user of the second computing device and the user of the first computing device; determining, by the first computing device, based on the user identifier associated with at least one of the user of the second computing device and the user of the first computing device, that an attribute of the at least one data file indicates that the user of the second computing device or the user of the first computing device previously accessed the at least one data file at an earlier time prior to the particular time; and responsive to determining that the attribute of the at least one data file indicates that the user of the second computing device or the user of the first computing device previously accessed the at least one data file at the earlier time prior to the particular time, determining, by the first computing device, that the at least one data file is likely to be accessed by the user of the first computing device at the particular time.

Clause 8. The method of any of clauses 1-7, wherein the at least one data file is a first data file, the method further comprising: determining, by the computing device, that a third computing device is located within the threshold distance of the location of the first computing device at the particular time; determining, by the computing device, a ranking associated with the second and third computing devices, wherein the ranking is based on distance from the location of the first computing device; identifying, by the first computing device and based on contextual information associated with the user of the first computing device and contextual information associated with a user of the third computing device, a second data file that the user of the first computing device is likely to access at the particular time; and outputting, by the first computing device, for display and based on the ranking, a graphical indication of the first data file and the second data file.

Clause 9. The method of any of clauses 1-8, further comprising: outputting, by the first computing device, for display, a graphical user interface comprising a plurality of graphical indications of data files that are accessible to the user of the first computing device at the particular time, the plurality of graphical indications including the graphical indication of the at least one data file, wherein the graphical indication of the at least one data file is different from each, other graphical indication of the plurality of graphical indications.

Clause 10. The method of any of clauses 1-9, wherein the contextual information associated with the user of the first computing device and the contextual information associated with the user of the second computing device comprises ambient audio data detected by each of the first and second computing devices at the particular time, the method further comprising: responsive to identifying corresponding portions of the ambient audio data detected by each of the first and second computing devices, determining, by the first computing device, that the second computing device is located within the threshold distance of the location of the first computing device at the particular time.

Clause 11. A first computing device, comprising: at least one processor; and at least one module operable by the at least one processor to: determine a location of the first computing device at a particular time; responsive to determining that a second computing device is located within a threshold distance of the location of the first computing device at the particular time, identify, based on contextual information associated with a user of the first computing device and contextual information associated with a user of the second computing device, at least one data file that the user of the first computing device is likely to access at the particular time; and output, for display, a graphical indication of the at least one data file.

Clause 12. The first computing device of clause 11, wherein the at least one module is further operable by the at least one processor to identify the at least one data file by at least: determining that an attribute of the at least one data file indicates that the user of the first computing device and the user of the second computing device each accessed the at least one data file at a time prior to the particular time; and identifying, based on the attribute, the at least one data file.

Clause 13. The first computing device any of clauses 11-12, wherein the at least one module is further operable by the at least one processor to identify the at least one data file by at least: responsive to determining that a portion of content of the at least one data file is related to a calendar event associated with at least one of the user of the first computing device and the user of the second computing device and occurring at the particular time, identifying the at least one data file, wherein the calendar event is associated with the particular time.

Clause 14. The first computing device any of clauses 11-13, wherein the at least one module is further operable by the at least one processor to identify the at least one data file by at least: responsive to determining that a portion of content of the at least one data file is related to the location of the first computing device, identifying the at least one data file.

Clause 15. The first computing device any of clauses 11-14, wherein the at least one module is further operable by the at least one processor to determine that the second computing device is located within a threshold distance of the location of the first computing device at the particular time by at least: detecting a wireless communication signal associated with the second computing device; determining, based on the wireless communication signal, a maximum detectable range associated with the wireless communication signal; responsive to determining that the maximum detectable range does not exceed a threshold distance, determining that the second computing device is located within the threshold distance of the location of the first computing device at the particular time.

Clause 16. The first computing device any of clauses 11-15, wherein the at least one module is further operable by the at least one processor to identify the at least one data file by at least: responsive to detecting a wireless communication signal associated with the second computing device, determining, based on the wireless communication signal, a device identifier associated with the second computing device; determining, based on the device identifier associated with the second computing device, that an attribute of the at least one data file indicates that the second computing device previously accessed the at least one data file at an earlier time prior to the particular time; and responsive to determining that the attribute of the at least one data file indicates that the second computing device previously accessed the at least one data file at the earlier time prior to the particular time, determining that the at least one data file is likely to be accessed by the user of the first computing device at the particular time.

Clause 17. The first computing device any of clauses 11-16, wherein the at least one module is further operable by the at least one processor to identify the at least one data file that the user of the first computing device is likely to access at the particular time by at least: determining, based on the contextual information associated with the user of the second computing device, a user identifier associated with at least one of the user of the second computing device and the user of the first computing device; determining, based on the user identifier associated with at least one of the user of the second computing device and the user of the first computing device, that an attribute of the at least one data file indicates that the user of the second computing device or the user of the first computing device previously accessed the at least one data file at an earlier time prior to the particular time; and responsive to determining that the attribute of the at least one data file indicates that the user of the second computing device or the user of the first computing device previously accessed the at least one data file at the earlier time prior to the particular time, determining that the at least one data file is likely to be accessed by the user of the first computing device at the particular time.

Clause 18. The first computing device any of clauses 11-17, wherein the at least one data file is a first data file wherein the at least one module is further operable by the at least one processor to: determine that a third computing device is located within the threshold distance of the location of the first computing device at the particular time; determine a ranking associated with the second and third computing devices, wherein the ranking is based on distance from the location of the first computing device; predict, based on contextual information associated with the user of the first computing device and contextual information associated with a user of the third computing device, a second data file that the user of the first computing device is likely to access at the particular time; and output, for display and based on the ranking, a graphical indication of the first data file predicted to be accessed by the user of the first computing device at the particular time and the second data file predicted to be accessed by the user of the first computing device at the particular time.

Clause 19. The first computing device any of clauses 11-18, wherein the at least one module is further operable by the at least one processor to: output, for display, a graphical user interface comprising a plurality of graphical indications of data files that are accessible to the user of the first computing device at the particular time, the plurality of graphical indications including the graphical indication of the at least one data file, wherein the graphical indication of the at least one data file is different from each, other graphical indication of the plurality of graphical indications.

Clause 20. The first computing device any of clauses 11-19, wherein the contextual information associated with the user of the first computing device and the contextual information associated with the user of the second computing device comprises ambient audio data detected by each of the first and second computing devices at the particular time, the at least one module being further operable by the at least one processor to: responsive to identifying corresponding portions of the ambient audio data detected by each of the first and second computing devices, determine that the second computing device is located within the threshold distance of the location of the first computing device at the particular time.

Clause 21. A method, comprising: determining, by a computing system, a location of a first computing device at a particular time; responsive to determining that a second computing device is located within a threshold distance of the location of the first computing device at the particular time, identifying, by the computing system, based on contextual information associated with a user of the first computing device and contextual information associated with a user of the second computing device, at least one data file that the user of the first computing device is likely to access at the particular time; and outputting, by the computing system, for transmission to the first computing device, an indication of the at least one data file.

Clause 22. The method of clause 21, wherein identifying the at least one data file comprises: determining, by the computing system, that an attribute of the at least one data file indicates that the user of the first computing device and the user of the second computing device each accessed the at least one data file at a time prior to the particular time; and identifying, by the computing system, based on the attribute, the at least one data file.

Clause 23. The method of any of clauses 21-22, wherein identifying the at least one data file comprises: determining, by the computing system, based on the contextual information associated with the user of the second computing device, a user identifier associated with the user of the second computing device; determining, by the computing system, based on the user identifier associated with the user of the second computing device, that an attribute of the at least one data file indicates that the user of the second computing device previously accessed the at least one data file at an earlier time prior to the particular time; and responsive to determining that the attribute of the at least one data file indicates that the user of the second computing device previously accessed the at least one data file at the earlier time prior to the particular time, determining, by the computing system, that the at least one data file is likely to be accessed by the user of the first computing device at the particular time.

Clause 24. The method of any of clauses 21-23, wherein identifying the at least one data file comprises: determining, by the computing system, based on the contextual information associated with the user of the first computing device, a user identifier associated with the user of the first computing device; determining, by the computing system, based on the user identifier associated with the user of the first computing device, that an attribute of the at least one data file indicates that the user of the first computing device previously accessed the at least one data file at an earlier time prior to the particular time; and responsive to determining that the attribute of the at least one data file indicates that the user of the first computing device previously accessed the at least one data file at the earlier time prior to the particular time, determining, by the computing system, that the at least one data file is likely to be accessed by the user of the first computing device at the particular time.

Clause 25. The method of any of clauses 21-24, further comprising: receiving, by the computing system, from each of the first computing device and the second computing device, ambient audio data detected by each of the first and second computing devices at the particular time; comparing, by the computing system, the ambient audio detected by the first computing device to the ambient audio detected by the second computing device; and responsive to identifying corresponding portions of the ambient audio data detected by each of the first and second computing devices, determining, by the computing system, that the second computing device is located within the threshold distance of the location of the first computing device at the particular time.

Clause 26. A computing system comprising: at least one processor; and at least one module operable by the at least one processor to: determine a location of a first computing device at a particular time; responsive to determining that a second computing device is located within a threshold distance of the location of the first computing device at the particular time, identify, based on contextual information associated with a user of the first computing device and contextual information associated with a user of the second computing device, at least one data file that the user of the first computing device is likely to access at the particular time; and output, for transmission to the first computing device, an indication of the at least one data file.

Clause 27. The computing system of clause 26, wherein the at least one module is further operable by the at least one processor to identify the at least one data file by at least: determining that an attribute of the at least one data file indicates that the user of the first computing device and the user of the second computing device each accessed the at least one data file at a time prior to the particular time; and identifying, based on the attribute, the at least one data file.

Clause 28. The computing system of any of clauses 26-27, wherein the at least one module is further operable by the at least one processor to identify the at least one data file by at least: determining, based on the contextual information associated with the user of the second computing device, a user identifier associated with the user of the second computing device; and determining, based on the user identifier associated with the user of the second computing device, that an attribute of the at least one data file indicates that the user of the second computing device previously accessed the at least one data file at an earlier time prior to the particular time; and responsive to determining that the attribute of the at least one data file indicates that the user of the second computing device previously accessed the at least one data file at the earlier time prior to the particular time, determining that the at least one data file is likely to be accessed by the user of the first computing device at the particular time.

Clause 29. The computing system of any of clauses 26-28, wherein the at least one module is further operable by the at least one processor to identify the at least one data file by at least: determining, based on the contextual information associated with the user of the first computing device, a user identifier associated with the user of the first computing device; and determining, based on the user identifier associated with the user of the first computing device, that an attribute of the at least one data file indicates that the user of the first computing device previously accessed the at least one data file at an earlier time prior to the particular time; and responsive to determining that the attribute of the at least one data file indicates that the user of the first computing device previously accessed the at least one data file at the earlier time prior to the particular time, determining that the at least one data file is likely to be accessed by the user of the first computing device at the particular time.

Clause 30. The computing system of any of clauses 26-29, wherein the at least one module is further operable by the at least one processor to: receive ambient audio data detected by each of the first and second computing devices at the particular time; compare the ambient audio detected by the first computing device to the ambient audio detected by the second computing device; and responsive to identifying corresponding portions of the ambient audio data detected by each of the first and second computing devices, determine that the second computing device is located within the threshold distance of the location of the first computing device at the particular time.

Clause 31. A computing device comprising means for performing any of the methods of clauses 1-10.

Clause 32. A computer-readable storage medium encoded with instructions for causing one or more programmable processors to perform any of the methods recited by clauses 1-10.

Clause 31. A computing system comprising means for performing any of the methods of clauses 21-25.

Clause 32. A computer-readable storage medium encoded with instructions for causing one or more programmable processors to perform any of the methods recited by clauses 21-25.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method, comprising:
   determining, by a first computing device, a location of the first computing device;
   determining, by the first computing device, whether a second computing device is located within a threshold distance of the location of the first computing device;
   responsive to determining that the second computing device is located within the threshold distance of the location of the first computing device, identifying, by the first computing device, based on contextual information associated with a user of the first computing device and contextual information associated with a user of the second computing device, at least one data file that the user of the first computing device is likely to access at a particular time, wherein:
      the contextual information associated with the user of the first computing device includes a calendar event on a first calendar and the contextual information associated with the user of the second computing device includes a calendar event on a second calendar;
      the calendar event on the first calendar corresponds to the calendar event on the second calendar and are each associated with the particular time; and
      at least a portion of content of the at least one data file is related to at least one of the first calendar event or the second calendar event associated with the particular time; and
   outputting, by the first computing device, for display, a graphical indication of the at least one data file.

2. The method of claim 1, wherein identifying the at least one data file comprises:
   determining, by the first computing device, that an attribute of the at least one data file indicates that the user of the first computing device and the user of the second computing device each accessed the at least one data file at a time prior to the particular time; and
   identifying, by the first computing device and based on the attribute, the at least one data file.

3. The method of claim 1, further comprising:
   determining, by the first computing device, whether the portion of content of the at least one data file is related to the calendar event on the first calendar or the calendar event on the second calendar,
   wherein the at least one data file is further identified in response to determining that at least the portion of content of the at least one data file is related to at least one of the calendar event on the first calendar or the calendar event on the second calendar.

4. The method of claim 1, wherein the at least one data file is further identified in response to determining that at least the portion of the content of the at least one data file is related to the location of the first computing device.

5. The method of claim 1, wherein determining that the second computing device is located within a threshold distance of the location of the first computing device further comprises:
   detecting, by the first computing device, a wireless communication signal associated with the second computing device;
   determining, by the first computing device, based on the wireless communication signal, a maximum detectable range associated with the wireless communication signal; and
   responsive to determining that the maximum detectable range does not exceed the threshold distance, determining, by the first computing device, that the second computing device is located within the threshold distance of the location of the first computing device.

6. The method of claim 1, wherein identifying the at least one data file further comprises:
responsive to detecting a wireless communication signal associated with the second computing device, determining, by the first computing device, based on the wireless communication signal, a device identifier associated with the second computing device;
determining, by the first computing device, based on the device identifier associated with the second computing device, that an attribute of the at least one data file indicates that the second computing device previously accessed the at least one data file at an earlier time prior to the particular time; and
responsive to determining that the attribute of the at least one data file indicates that the second computing device previously accessed the at least one data file at the earlier time prior to the particular time, determining, by the first computing device, that the at least one data file is likely to be accessed by the user of the first computing device at the particular time.

7. The method of claim 1, wherein identifying the at least one data file further comprises:
determining, by the first computing device, based on the contextual information associated with the user of the second computing device, a user identifier associated with at least one of the user of the second computing device or the user of the first computing device;
determining, by the first computing device, based on the user identifier associated with at least one of the user of the second computing device or the user of the first computing device, that an attribute of the at least one data file indicates that the user of the second computing device or the user of the first computing device previously accessed the at least one data file at an earlier time prior to the particular time; and
responsive to determining that the attribute of the at least one data file indicates that the user of the second computing device or the user of the first computing device previously accessed the at least one data file at the earlier time prior to the particular time, determining, by the first computing device, that the at least one data file is likely to be accessed by the user of the first computing device at the particular time.

8. The method of claim 1, wherein the at least one data file is a first data file, the method further comprising:
determining, by the computing device, that a third computing device is located within the threshold distance of the location of the first computing device;
determining, by the computing device, a ranking associated with the second and third computing devices, wherein the ranking is based on distance from the location of the first computing device;
identifying, by the first computing device and based on contextual information associated with the user of the first computing device and contextual information associated with a user of the third computing device, a second data file that the user of the first computing device is likely to access at the particular time; and
outputting, by the first computing device, for display and based on the ranking, a graphical indication of the first data file and the second data file.

9. The method of claim 1, further comprising:
outputting, by the first computing device, for display, a graphical user interface comprising a plurality of graphical indications of data files that are accessible to the user of the first computing device at the particular time, the plurality of graphical indications including the graphical indication of the at least one data file, wherein the graphical indication of the at least one data file is different from each other graphical indication of the plurality of graphical indications.

10. The method of claim 1, wherein the contextual information associated with the user of the first computing device and the contextual information associated with the user of the second computing device comprises ambient audio data detected by each of the first and second computing devices, the method further comprising:
responsive to identifying corresponding portions of the ambient audio data detected by each of the first and second computing devices, determining, by the first computing device, that the second computing device is located within the threshold distance of the location of the first computing device.

11. A first computing device, comprising:
at least one processor; and
at least one module operable by the at least one processor to:
determine a location of the first computing device;
determine whether a second computing device is located within a threshold distance of the location of the first computing device;
responsive to determining that the second computing device is located within the threshold distance of the location of the first computing device, identify, based on contextual information associated with a user of the first computing device and contextual information associated with a user of the second computing device, at least one data file that the user of the first computing device is likely to access at a particular time, wherein:
the contextual information associated with the user of the first computing device includes a calendar event on a first calendar and the contextual information associated with the user of the second computing device includes a calendar event on a second calendar;
the calendar event on the first calendar corresponds to the calendar event on the second calendar and are each associated with the particular time; and
at least a portion of content of the at least one data file is related to at least one of the first calendar event or the second calendar event associated with the particular time; and
output, for display, a graphical indication of the at least one data file.

12. The first computing device of claim 11, wherein the at least one module is further operable by the at least one processor to identify the at least one data file by at least:
determining that an attribute of the at least one data file indicates that the user of the first computing device and the user of the second computing device each accessed the at least one data file at a time prior to the particular time; and
identifying, based on the attribute, the at least one data file.

13. The first computing device of claim 11, wherein the at least one module is further operable by the at least one processor to:
determine whether the portion of content of the at least one data file is related to the calendar event on the first calendar or the calendar event on the second calendar, identify the at least one data file in response to determining that at least the portion of content of the at least one data file is related to at least one of the calendar event on the first calendar of the calendar event on the second calendar.

14. The first computing device of claim 11, wherein the at least one module is further operable by the at least one processor to identify the at least one data file in response to determining that at least the content of the at least one data file is related to the location of the first computing device.

15. The first computing device of claim 11, wherein the at least one module is further operable by the at least one processor to determine that the second computing device is located within a threshold distance of the location of the first computing device by at least:
  detecting a wireless communication signal associated with the second computing device;
  determining, based on the wireless communication signal, a maximum detectable range associated with the wireless communication signal; and
  responsive to determining that the maximum detectable range does not exceed the threshold distance, determining that the second computing device is located within the threshold distance of the location of the first computing device.

16. The first computing device of claim 11, wherein the at least one module is further operable by the at least one processor to identify the at least one data file by at least:
  responsive to detecting a wireless communication signal associated with the second computing device, determining, based on the wireless communication signal, a device identifier associated with the second computing device;
  determining, based on the device identifier associated with the second computing device, that an attribute of the at least one data file indicates that the second computing device previously accessed the at least one data file at an earlier time prior to the particular time; and
  responsive to determining that the attribute of the at least one data file indicates that the second computing device previously accessed the at least one data file at the earlier time prior to the particular time, determining that the at least one data file is likely to be accessed by the user of the first computing device at the particular time.

17. The first computing device of claim 11, wherein the at least one module is further operable by the at least one processor to identify the at least one data file that the user of the first computing device is likely to access at the particular time by at least:
  determining, based on the contextual information associated with the user of the second computing device, a user identifier associated with at least one of the user of the second computing device or the user of the first computing device;
  determining, based on the user identifier associated with at least one of the user of the second computing device or the user of the first computing device, that an attribute of the at least one data file indicates that the user of the second computing device or the user of the first computing device previously accessed the at least one data file at an earlier time prior to the particular time; and
  responsive to determining that the attribute of the at least one data file indicates that the user of the second computing device or the user of the first computing device previously accessed the at least one data file at the earlier time prior to the particular time, determining that the at least one data file is likely to be accessed by the user of the first computing device at the particular time.

18. The first computing device of claim 11, wherein the at least one data file is a first data file wherein the at least one module is further operable by the at least one processor to:
  determine that a third computing device is located within the threshold distance of the location of the first computing device;
  determine a ranking associated with the second and third computing devices, wherein the ranking is based on distance from the location of the first computing device;
  predict, based on contextual information associated with the user of the first computing device and contextual information associated with a user of the third computing device, a second data file that the user of the first computing device is likely to access at the particular time; and
  output, for display and based on the ranking, a graphical indication of the first data file predicted to be accessed by the user of the first computing device at the particular time and the second data file predicted to be accessed by the user of the first computing device at the particular time.

19. The first computing device of claim 11, wherein the at least one module is further operable by the at least one processor to:
  output, for display, a graphical user interface comprising a plurality of graphical indications of data files that are accessible to the user of the first computing device at the particular time, the plurality of graphical indications including the graphical indication of the at least one data file, wherein the graphical indication of the at least one data file is different from each, other graphical indication of the plurality of graphical indications.

20. The first computing device of claim 11, wherein the contextual information associated with the user of the first computing device and the contextual information associated with the user of the second computing device comprises ambient audio data detected by each of the first and second computing devices, the at least one module being further operable by the at least one processor to:
  responsive to identifying corresponding portions of the ambient audio data detected by each of the first and second computing devices, determine that the second computing device is located within the threshold distance of the location of the first computing device.

21. A method, comprising:
  determining, by a computing system, a location of a first computing device;
  determining, by the computing system, whether a second computing device is located within a threshold distance of the location of the first computing device;
  responsive to determining that the second computing device is located within the threshold distance of the location of the first computing device, identifying, by the computing system, based on contextual information associated with a user of the first computing device and contextual information associated with a user of the second computing device, at least one data file that the user of the first computing device is likely to access at a particular time, wherein:
    the contextual information associated with the user of the first computing device includes a calendar event on a first calendar and the contextual information associated with the user of the second computing device includes a calendar event on a second calendar;

the calendar event on the first calendar corresponds to the calendar event on the second calendar and are each associated with the particular time; and at least a portion of content of the at least one data file is related to at least one of the first calendar event or the second calendar event associated with the particular time; and outputting, by the computing system, for transmission to the first computing device, an indication of the at least one data file.

22. The method of claim 21, wherein identifying the at least one data file comprises:

determining, by the computing system, that an attribute of the at least one data file indicates that the user of the first computing device and the user of the second computing device each accessed the at least one data file at a time prior to the particular time; and identifying, by the computing system, based on the attribute, the at least one data file.

23. The method of claim 21, wherein identifying the at least one data file comprises:

determining, by the computing system, based on the contextual information associated with the user of the second computing device, a user identifier associated with the user of the second computing device;

determining, by the computing system, based on the user identifier associated with the user of the second computing device, that an attribute of the at least one data file indicates that the user of the second computing device previously accessed the at least one data file at an earlier time prior to the particular time; and responsive to determining that the attribute of the at least one data file indicates that the user of the second computing device previously accessed the at least one data file at the earlier time prior to the particular time, determining, by the computing system, that the at least one data file is likely to be accessed by the user of the first computing device at the particular time.

24. The method of claim 21, wherein identifying the at least one data file comprises:

determining, by the computing system, based on the contextual information associated with the user of the first computing device, a user identifier associated with the user of the first computing device;

determining, by the computing system, based on the user identifier associated with the user of the first computing device, that an attribute of the at least one data file indicates that the user of the first computing device previously accessed the at least one data file at an earlier time prior to the particular time; and responsive to determining that the attribute of the at least one data file indicates that the user of the first computing device previously accessed the at least one data file at the earlier time prior to the particular time, determining, by the computing system, that the at least one data file is likely to be accessed by the user of the first computing device at the particular time.

25. The method of claim 21, further comprising:

receiving, by the computing system, from each of the first computing device and the second computing device, ambient audio data detected by each of the first and second computing devices;

comparing, by the computing system, the ambient audio detected by the first computing device to the ambient audio detected by the second computing device; and responsive to identifying corresponding portions of the ambient audio data detected by each of the first and second computing devices, determining, by the computing system, that the second computing device is located within the threshold distance of the location of the first computing device.

26. A computing system comprising:

at least one processor; and at least one module operable by the at least one processor to:

determine a location of a first computing device;

determine whether a second computing device is located within a threshold distance of the location of the first computing device;

responsive to determining that the second computing device is located within the threshold distance of the location of the first computing device time, identify, based on contextual information associated with a user of the first computing device and contextual information associated with a user of the second computing device, at least one data file that the user of the first computing device is likely to access at a particular time, wherein:

the contextual information associated with the user of the first computing device includes a calendar event on a first calendar and the contextual information associated with the user of the second computing device includes a calendar event on a second calendar;

the calendar event on the first calendar corresponds to the calendar event on the second calendar and each are associated with the particular time; and at least a portion a portion of content of the at least one data file is related to at least one of the first calendar event or the second calendar event associated with the particular time; and output, for transmission to the first computing device, an indication of the at least one data file.

27. The computing system of claim 26, wherein the at least one module is further operable by the at least one processor to identify the at least one data file by at least:

determining that an attribute of the at least one data file indicates that the user of the first computing device and the user of the second computing device each accessed the at least one data file at a time prior to the particular time; and identifying, based on the attribute, the at least one data file.

28. The computing system of claim 26, wherein the at least one module is further operable by the at least one processor to identify the at least one data file by at least:

determining, based on the contextual information associated with the user of the second computing device, a user identifier associated with the user of the second computing device; and determining, based on the user identifier associated with the user of the second computing device, that an attribute of the at least one data file indicates that the user of the second computing device previously accessed the at least one data file at an earlier time prior to the particular time; and responsive to determining that the attribute of the at least one data file indicates that the user of the second computing device previously accessed the at least one data file at the earlier time prior to the particular time, determining that the at least one data file is likely to be accessed by the user of the first computing device at the particular time.

29. The computing system of claim 26, wherein the at least one module is further operable by the at least one processor to identify the at least one data file by at least:
    determining, based on the contextual information associated with the user of the first computing device, a user identifier associated with the user of the first computing device; and
    determining, based on the user identifier associated with the user of the first computing device, that an attribute of the at least one data file indicates that the user of the first computing device previously accessed the at least one data file at an earlier time prior to the particular time; and
    responsive to determining that the attribute of the at least one data file indicates that the user of the first computing device previously accessed the at least one data file at the earlier time prior to the particular time, determining that the at least one data file is likely to be accessed by the user of the first computing device at the particular time.

30. The computing system of claim 26, wherein the at least one module is further operable by the at least one processor to:
    receive ambient audio data detected by each of the first and second computing devices;
    compare the ambient audio detected by the first computing device to the ambient audio detected by the second computing device; and
    responsive to identifying corresponding portions of the ambient audio data detected by each of the first and second computing devices, determine that the second computing device is located within the threshold distance of the location of the first computing device.

* * * * *